United States Patent
Yamaji

(10) Patent No.: US 9,020,328 B2
(45) Date of Patent: Apr. 28, 2015

(54) IMAGE PROCESSING DEVICE, IMAGE PROCESSING METHOD, AND PROGRAM

(75) Inventor: Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 509 days.

(21) Appl. No.: 13/185,046

(22) Filed: Jul. 18, 2011

(65) Prior Publication Data

US 2012/0020648 A1  Jan. 26, 2012

(30) Foreign Application Priority Data

Jul. 22, 2010 (JP) .................. 2010-165036
Jun. 6, 2011 (JP) .................. 2011-126399

(51) Int. Cl.
H04N 5/93 (2006.01)
H04N 9/80 (2006.01)
G11B 27/034 (2006.01)

(52) U.S. Cl.
CPC .................. *G11B 27/034* (2013.01)

(58) Field of Classification Search
None
See application file for complete search history.

(56) References Cited

U.S. PATENT DOCUMENTS

| | | | |
|---|---|---|---|
| 7,773,782 B2 | 8/2010 | Funakura | |
| 8,090,196 B2 | 1/2012 | Kojima et al. | |
| 8,289,434 B2 | 10/2012 | Murase | |
| 8,681,257 B2 | 3/2014 | Murase | |
| 2004/0161224 A1* | 8/2004 | Yamazoe et al. | 386/52 |
| 2004/0258304 A1* | 12/2004 | Shiota et al. | 382/170 |
| 2006/0204044 A1 | 9/2006 | Takemoto et al. | |
| 2006/0204135 A1 | 9/2006 | Funakura | |
| 2008/0075338 A1* | 3/2008 | Muramatsu et al. | 382/118 |
| 2008/0107331 A1 | 5/2008 | Kojima et al. | |
| 2008/0304808 A1* | 12/2008 | Newell et al. | 386/52 |
| 2009/0119583 A1* | 5/2009 | Kihara et al. | 715/273 |
| 2009/0244625 A1 | 10/2009 | Hasegawa et al. | |
| 2009/0244646 A1 | 10/2009 | Kondo et al. | |
| 2009/0245643 A1 | 10/2009 | Hasegawa et al. | |
| 2009/0249177 A1* | 10/2009 | Yamaji et al. | 715/204 |
| 2010/0073488 A1 | 3/2010 | Murase | |
| 2014/0056539 A1* | 2/2014 | Kashiwa et al. | 382/278 |

FOREIGN PATENT DOCUMENTS

| | | |
|---|---|---|
| JP | 2008065792 | 3/2006 |
| JP | 2006277729 | 10/2006 |
| JP | 2006287917 | 10/2006 |

(Continued)

OTHER PUBLICATIONS

Japanese Office Action, dated Sep. 2, 2014, in corresponding Japanese Patent Application No. 2011-126399, with partial English translation.

*Primary Examiner* — Heather Jones
(74) *Attorney, Agent, or Firm* — Young & Thompson

(57) ABSTRACT

The image processing device includes an image data input unit for receiving data of moving images and still images; an image grouping unit for classifying the moving images and the still images into groups; an image analyzer for analyzing the moving images and the still images classified by group, and obtaining analysis information of the images, and information on relationship between the moving images and the still images; a frame image extractor for extracting frame images from the moving images according to at least one of the analysis information and the relationship information; a layout determining unit for determining a layout of the still images and the frame images according to at least one of the analysis information and the relationship information; and an image arranging unit for arranging the still images and the frame images according to the layout.

35 Claims, 25 Drawing Sheets

(56) References Cited

FOREIGN PATENT DOCUMENTS

| | | |
|---|---|---|
| JP | 2006318449 | 11/2006 |
| JP | 2009-118060 | 5/2009 |
| JP | 2009-246887 | 10/2009 |
| JP | 2009-246897 | 10/2009 |
| JP | 2009246890 | 10/2009 |
| JP | 2010079570 | 4/2010 |

* cited by examiner

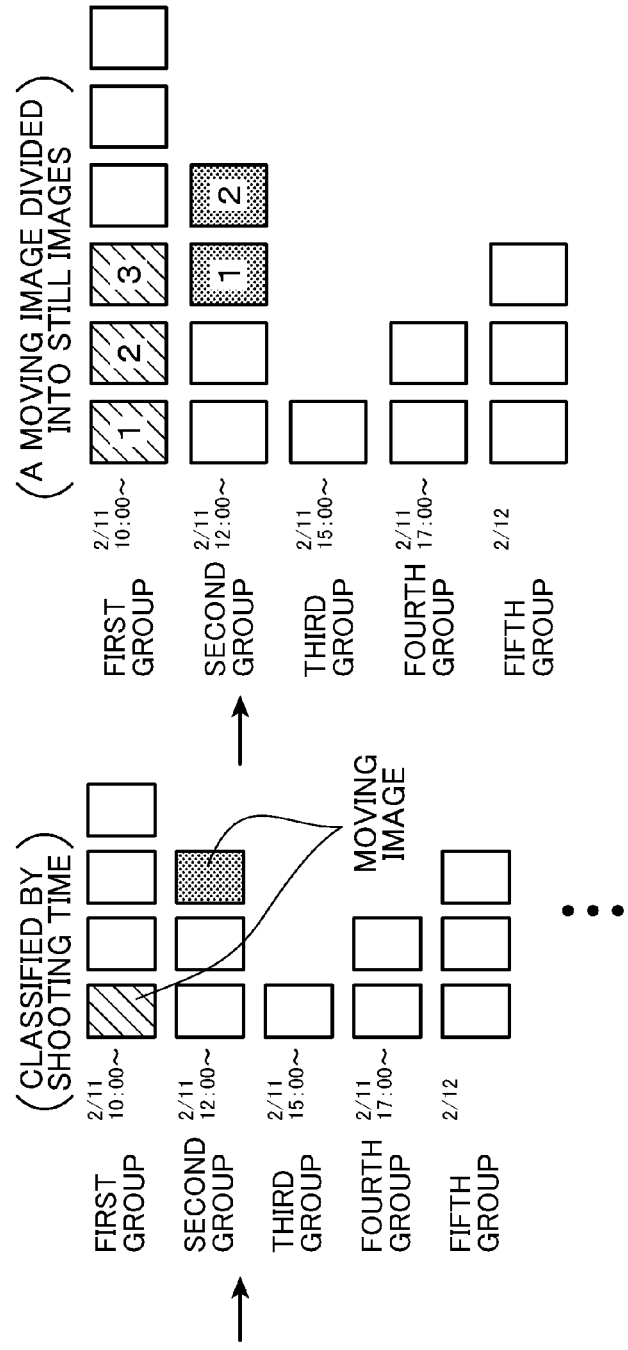

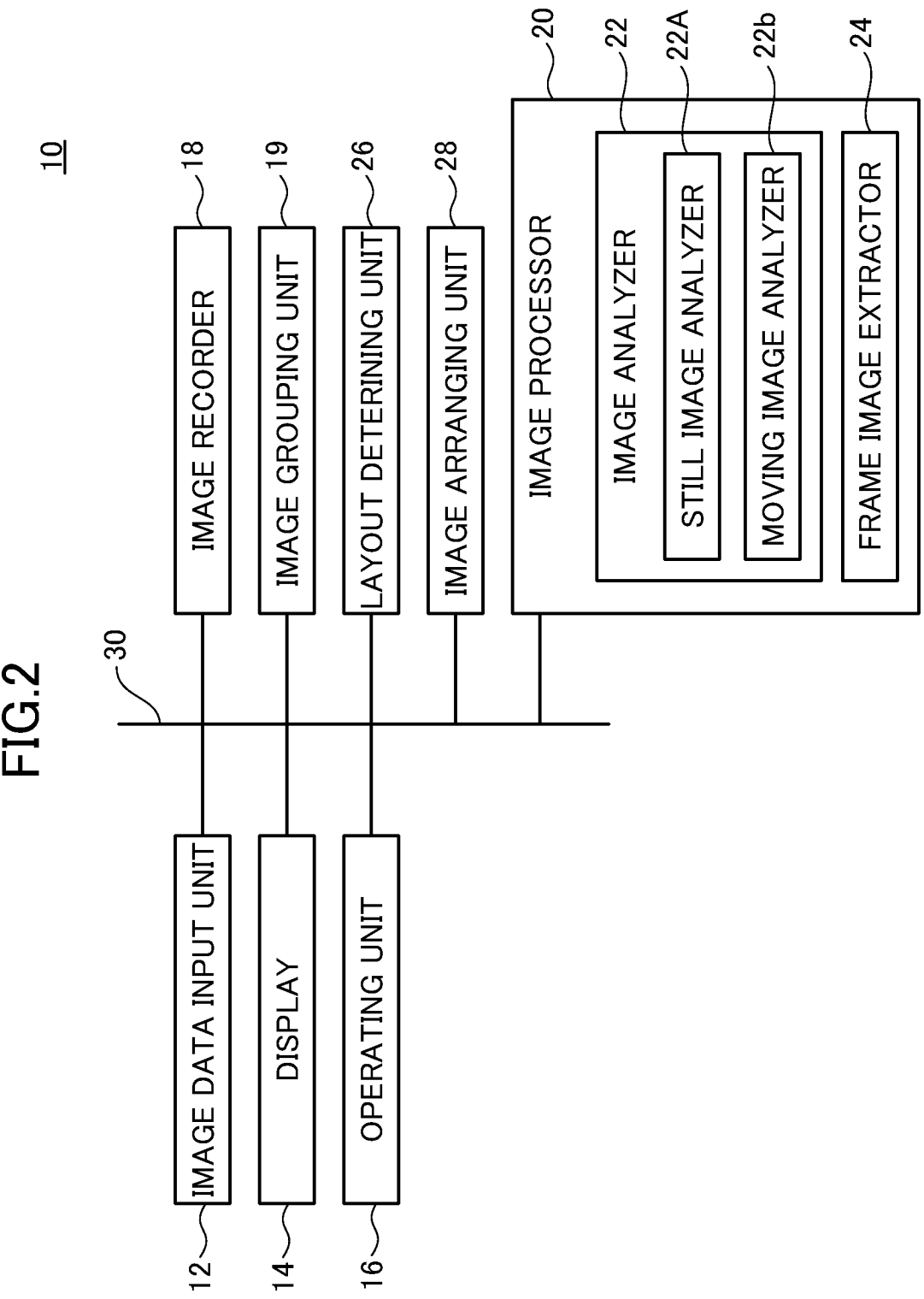

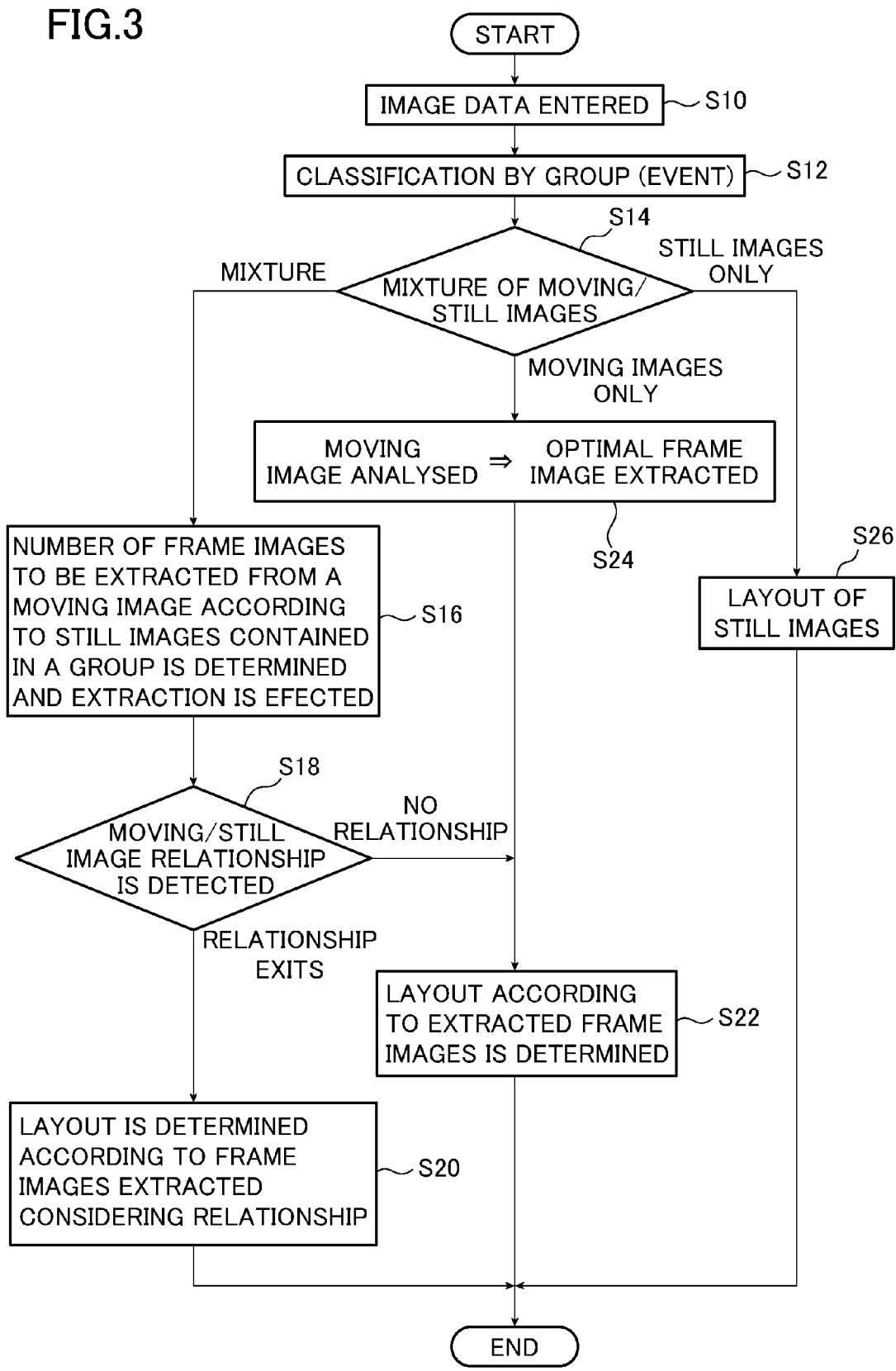

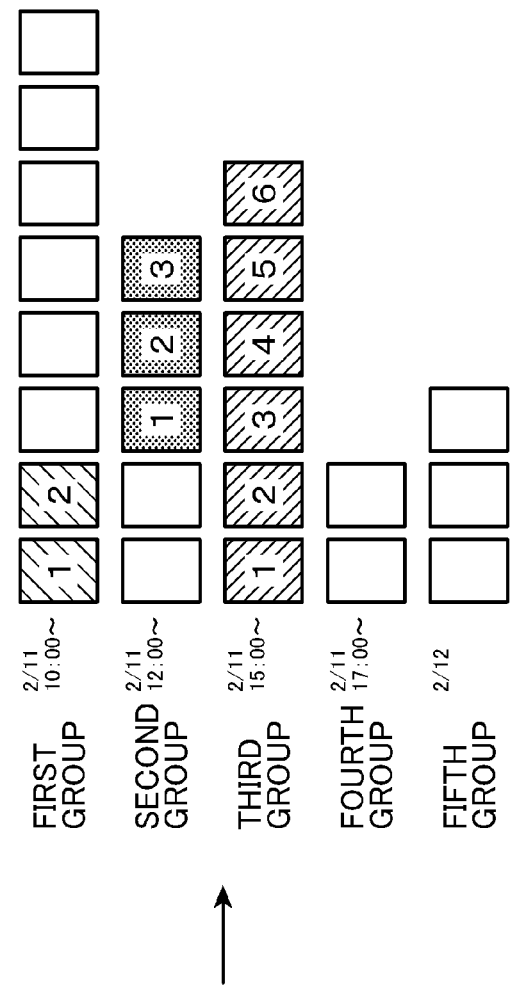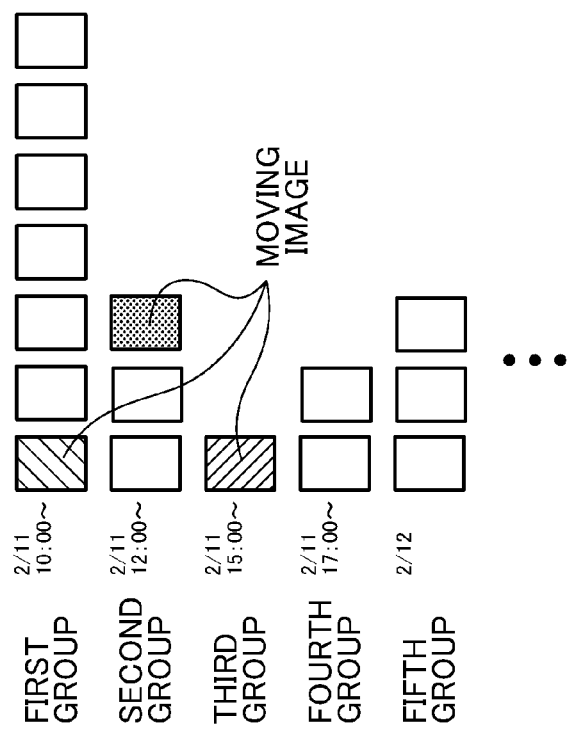

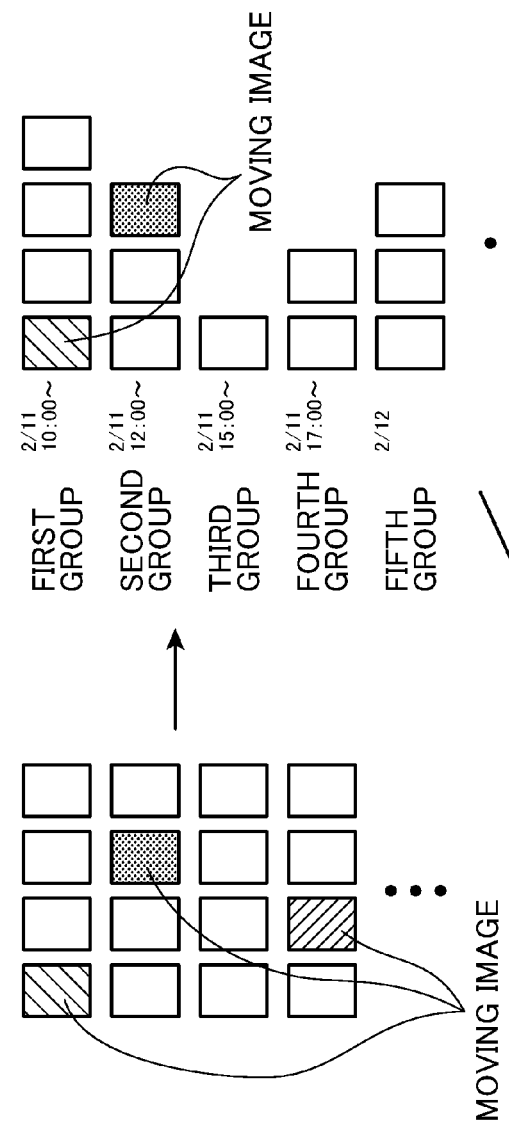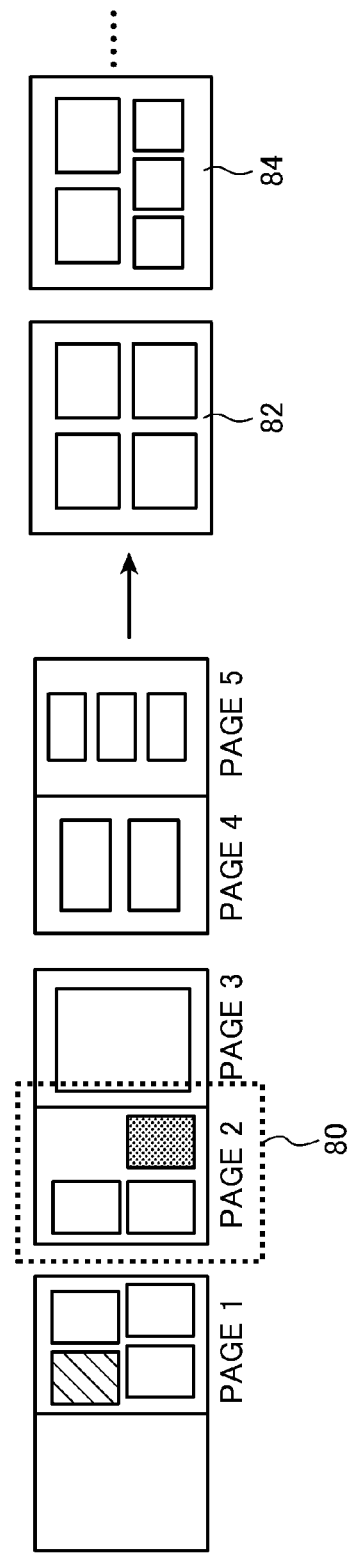

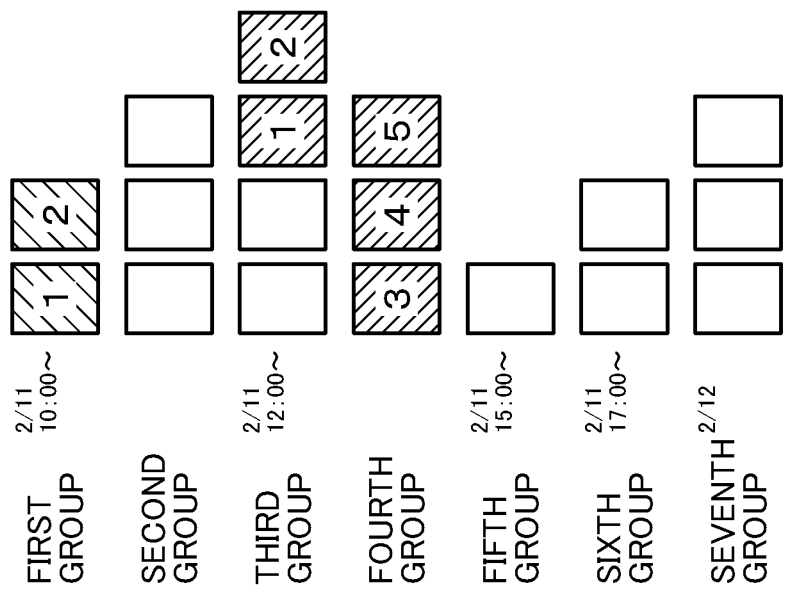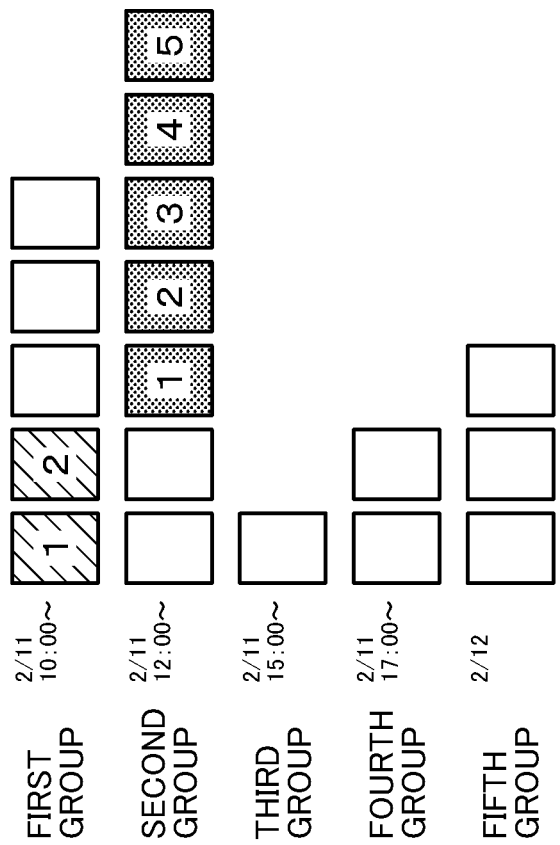

IMAGE PROCESSING DEVICE, IMAGE PROCESSING METHOD, AND PROGRAM

BACKGROUND OF THE INVENTION

The present invention relates to an image processing device, an image processing method and program and more particularly to an image processing method and program wherein still images (referred to below as frame images) are extracted from a moving image in data containing still images and moving images according to relationship between the still images and the moving image, and wherein the still images and the moving image are arranged.

As recent digital still cameras acquire enhanced performance, some of those on the market are now capable of recording high-resolution moving images. Accordingly, there are demands for printing or placing in a photograph album not only still images but frame images cut out from a moving image. Against such background, there have been made various propositions as to an easy-to-see layout and list of still images and frame images.

JP 2009-118060 A, for example, describes an image display device whereby a characteristics amount is acquired by extracting still images from image data of still images or moving images to determine their positions in a layout in a display area based on the characteristics amount and display images intended for display obtained by reducing the size of still images in the form of a list in the display area. The literature also describes that where the image data of moving image contains a plurality of contents, the image data of moving image is divided into events or segments to extract still images representing the moving image from noise-free portions thereof and arrange the still images close to each other.

JP 2009-246887 A describes extracting frame image information corresponding to a given number of frame images from each of moving image files stored in a storage medium, and the arrangement order is determined in such a manner that an index image corresponding to the extracted frame image information and an index image corresponding to the still image file read out from the storage medium can be arranged according to an order satisfying given conditions JP 2009-246897 A describes a case where a list of images containing index images extracted from a moving image file and index images extracted from a still image file is to be printed, that patent literature describing correcting the size of the index images so as to coincide with the reference characteristics amount of the size information, correcting the colors of the index images so as to coincide with the reference characteristics amount of the color information before printing, so that the printed list of images has a visual unity among the index images produced from the moving image file and the still image file.

SUMMARY OF THE INVENTION

However, where, when extracting a still image from a moving image at a time a previously designated time has elapsed from the beginning of a moving image is extracted in order to extract a noise-free portion as in JP 2009-118060 A, or where noise in the image data of a moving image is analyzed for still image extraction, the still images extracted from the moving image are certainly still images representative of the moving image but are not necessarily images the user desires to print as still images or use as material for a photograph album.

Further, as in JP 2009-246887 A and JP 2009-246897 A, where, after extraction of a moving image and still images, arrangement conditions are determined and image corrections are made to provide unity in the layout, images most appropriate for printing may not necessarily be extracted or images contained in a moving image, which, when used, would provide unity without requiring image corrections, actually may not necessarily be used. Further, displaying images in a mere list may give a monotonous, boring impression as prints, photograph albums, electronic albums, and the like.

It is an object of the invention to provide an image processing device, an image processing method and program for producing more attractive image arrangement data by producing a layout according to relationship obtained by classifying moving images and still images into groups and analyzing these images.

In order to attain the object described above, the present invention provides an image processing device for making a layout of images, comprising:

an image data input unit for receiving data of moving images and still images, an image grouping unit for classifying the moving images and the still images into groups under a given condition, an image analyzer for analyzing the moving images and the still images as classified by the group, and obtaining analysis information obtained by analyzing the moving images and the still images and relationship information indicating relationship between the moving images and the still images, a frame image extractor for determining a number of frame images to be extracted from each of the moving images by the group according to at least one of the analysis information and the relationship information, and extracting a determined number of frame images, a layout determining unit for determining a layout of the still images and the frame images by the group according to at least one of the analysis information and the relationship information, and an image arranging unit for arranging the still images and the frame images by the group according to the layout.

Also, the present invention provides an image processing method of producing a layout of images, comprising:

an image data entering step of receiving data of moving image and still image, an image grouping step of classifying the moving images and the still image into groups under a given condition, an image analyzing step of analyzing the moving images and the still images as classified by the group, and obtaining analysis information obtained by analyzing the moving images and the still images and relationship information indicating relationship between the moving images and the still images, a frame image extracting step of determining a number of frame images to be extracted from each of the moving images by the group according to at least one of the analysis information and the relationship information, and extracting a determined number of frame images, a layout determining step of determining a layout of the still images and the frame images by the group according to at least one of the analysis information and the relationship information, and an image arranging step of arranging the still images and the frame images by the group according to the layout.

Also, the present invention provides a non-transitory computer readable medium storing a computer program for causing a computer to perform an image processing method of making a layout of images described above.

The present invention enables production of arrangement data where a still image and optimal frame images are arranged according to the relationship between a moving image and still images without requiring much effort for selecting frame images the user desires to use from an image even when the material data contain moving image data and still image data mixed therein.

BRIEF DESCRIPTION OF THE DRAWINGS

FIGS. 1A to FIG. 1C are views for explaining an idea of classification and frame image extraction according to the present invention.

FIG. 2 is a block diagram showing an example of a configuration of the image processing device for implementing the image processing method of the present invention.

FIG. 3 is a flowchart indicating an example of the flow of the image processing method of the present invention.

FIG. 4A is a view for explaining an example of classification; FIG. 4B is a view for explaining an example of classification where a frame image extraction was implemented.

FIG. 12A is a view for explaining an example showing a state before classification is effected; FIG. 12B is a view for explaining an example showing a state after classification is effected; FIG. 12C is a view for explaining an example where images have been arranged; FIG. 12D is a view for explaining an example illustrating an example of template for recomposition of a page for which a recomposition instruction has been entered.

FIGS. 38A and 38B respectively illustrate how the number of frame images is increased according to the number of pages of a photograph album designated by the user, and how the images shown in FIG. 38A are divided and allocated to 7 pages.

DETAILED DESCRIPTION OF THE INVENTION

Figure 5:
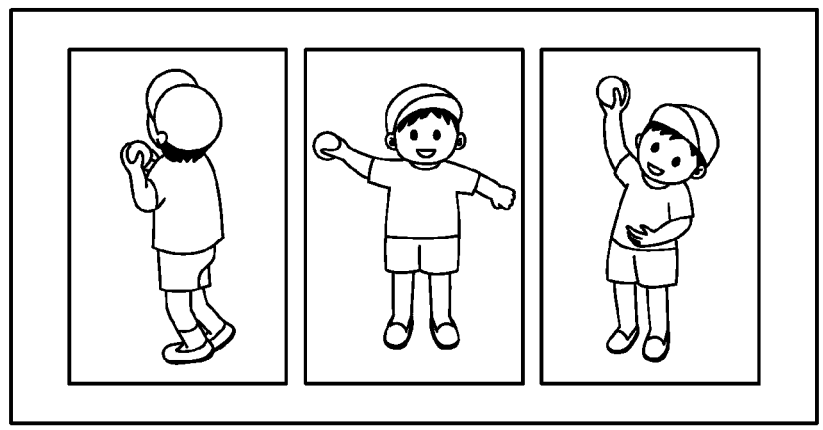
FIG. 5 is a view for explaining an example of an effective layout related to the same subject.

The following describes in detail the image processing device of the present invention for implementing the image processing method of the invention based upon the preferred embodiments illustrated in the accompanying drawings.

First, a method of the invention for classifying moving images and still images and extracting frame images from moving images will be described by referring to FIG. 1.

FIG. 1 is a view for explaining a concept of classification and frame image extraction according to the invention. First, when image data containing moving images and still images is entered as illustrated in FIG. 1A, classification of moving images and still images is made by event or by shooting time as illustrated in FIG. 1B. Then, moving images and still images of each group are analyzed by group to obtain analysis information obtained by analyzing the moving images and still images and information on the relationship between the moving images and still images. Subsequently, the number of frame images to be extracted from each moving image is determined according to the analysis information and/or the relationship information to extract a determined number of frame images. In an example illustrated in FIG. 1C, for example, three frame images are extracted from the moving image classified into a first group; two frame images are extracted from the moving image classified into a second group. Thus, appropriate frame images are extracted by extracting frame images according to the analysis information and/or the relationship information.

FIG. 2 is a block diagram illustrating an embodiment of configuration of an image processing device of the invention for implementing an image processing method of the invention.

An image processing device 10 illustrated in FIG. 2 comprises an image data input unit 12, an image display 14, an operating unit 16, an image recorder 18, an image grouping unit 19, an image processor 20, a layout determining unit 26, and an image arranging unit 28, all connected by a bus 30. The image processor 20 comprises an image analyzer 22 and a frame image extractor 24. In this embodiment, an example for producing a photograph album will be described.

The image data input unit 12 has an external interface and receives moving image data and still image data (moving image/still image data) to be used for producing a photograph album. The image data supplied to the image data input unit 12 is not specifically limited and may be various image data including moving image/still image data acquired by the user with a digital still camera or a digital video camera and moving image/still image data downloaded from a network. The external interfaces include USB (Universal Serial Bus), memory card reader/writer, optical discs, and wired and wireless LAN (Local Area Network). Image data supplied to the image data input unit 12 is outputted as material image data (moving image/still image data).

The image display 14 displays an editing screen of an image processing application that runs in the image processing device 10, data whose images have been arranged (e.g., arrangement image in a photograph album), operation screens for the user to perform various operations, and the like.

The operating unit 16 is provided to perform various operations of the image processing device 10. The operating unit 16 is not particularly limited, and any of various known operating devices may be used such as a keyboard, a mouse, and a touch panel.

The image recorder 18 records entered material image data (moving image/still image data), frame image data, layout data of still images and frame images, arrangement data representing an arrangement image, and the like. The image recorder 18 may be a semiconductor memory such as a DRAM (Dynamic Random Access Memory) and a flash memory or a magnetic recording medium such as an HDD (Hard Disk Drive).

The image grouping unit 19 classifies entered material image data (moving image/still image data) into groups according to a given condition (event). The given condition may be, for example, shooting time, shooting location obtained by GPS (Global Positioning System), etc., direction in which the subject faces, or movement of the subject. The classification results may be added to material image data as classification information and may be managed using a table separately provided in the image recorder 18.

The image analyzer 22 comprises a still image analyzer 22a and a moving image analyzer 22b. The image analyzer 22 makes analysis to determine whether each group contains moving images and still images, that is, whether moving images and still images are mixedly contained.

The still image analyzer 22a analyzes the still image data for each of the groups into which classification has been made by the image grouping unit 19 to obtain a maximum number of frame images that can be extracted from a moving image (referred to below as maximum extractable number), analysis information obtained by analyzing a still image, and information on relationship between a moving image and a still image (referred to below as relationship information). The maximum extractable number may be, for example, a number obtained by subtracting the number of still images from a predetermined reference number of images contained in the same group.

The reference number of images contained in the same group is a maximum number of images that may be arranged by group. When, for example, each group of images is assigned one page of a photograph album, the reference number of images is a maximum number of images that may be arranged in one page of the photograph album.

Figure 33:
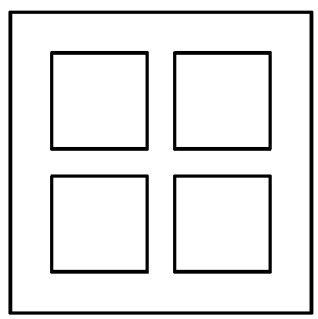
FIG. 33 is a view for explaining an example of composition of a template for arranging four images in one page.

When, for example, a template of a layout for arranging images in preset positions in a page (predetermined candidate layout) is used, the reference number of images is a maximum number of images that may be used (arranged) in that template. When, for example, a template shown in FIG. 33 is used, four images may be arranged and therefore the reference number of images is four. When a template is used, the reference number of images varies with a template used.

On the other hand, when images are arranged in arbitrary positions in a page without using an existing template (free layout), the image processing device has therein set a maximum number of images that may be arranged in one page considering ease of viewing. In the case of free layout, therefore, the reference number of images is "a maximum number of images that may be arranged in one page" as preset in the image processing device 10.

The analysis information may be at least one of, for example, subject's face recognition result, face direction, the number of subjects, size of the subject, position of the subject, direction in which the subject faces, subject's facial expression recognition, shooting time, shooting location, composition, vanishing point, color, brightness of the whole image, vividness of the whole image, identification of a person, shooting condition, resolution of an image, aspect ratio of a image, and shooting mode.

As for the relationship information, representative values thereof may be obtained by weighting the above information obtained by comparing analysis information on moving images and still images, the representative values being in a range such that an upper limit is 100 and a lower limit is 0. Alternatively, the analysis information may be used as relationship information. The composition is exemplified by a landscape showing a person, a building, a sky, and the like; the shooting mode is exemplified by a normal shooting mode, a panoramic shooting mode, a close-up mode, and a person shooting mode.

Similarly to the still image analyzer 22a, the moving image analyzer 22b analyzes moving image data for each of the groups into which classification has been made by the image grouping unit 19 to obtain analysis information and relationship information. The analysis information may also be movement detection information and camera movement amount (pan, tilt).

The frame image extractor 24 determines, by group, the number of images to be extracted from moving images that does not exceed the maximum extractable number according to the analysis information and/or relationship information of moving images and of still images obtained by the image analyzer 22 and extracts a determined number of frame images. For example, when frame images are extracted based on the shooting time, a table as shown in Table 1 is previously produced, and the extraction number is determined based on that table to extract frame images from moving images. The data of the extracted frame images (frame image data) is stored in the image recorder 18.

TABLE 1

| Moving image shooting time | Number of extracted images |
|---|---|
| 1 s-5 s | 1 |
| 6 s-10 s | 2 |
| . | . |
| . | . |
| . | . |

When, for example, the "face direction" is used, the variation in face direction may be held as fixed value in lieu of using the table. For example, when the face direction changed by 15 degrees or more from a given position, the frame image may be extracted. Further, when the frame image is extracted based on the shooting mode, if a still image is a close-up image, a frame image close to a close-up image may be extracted from a moving image.

The frame image extractor 24 may extract frame images from moving images according to imaging time (reproduction time) in the analysis information on moving images, imaged content in the analysis information on moving images, and/or relationship information without considering the reference number of images.

When the total number of still images and frame images in a group exceeds the reference number of images, recommended frame images (frame images judged by the frame image extractor 24 to be preferable) are extracted from the extracted frame images according to the analysis information on still images (including extracted from images) without exceeding the reference number of images. In this case, frame images may be each rated with marks in such a manner that, for example, an image showing a person's face in a great proportion is given high marks, and frame images given high marks may be used without exceeding the reference number of images.

Figure 34:
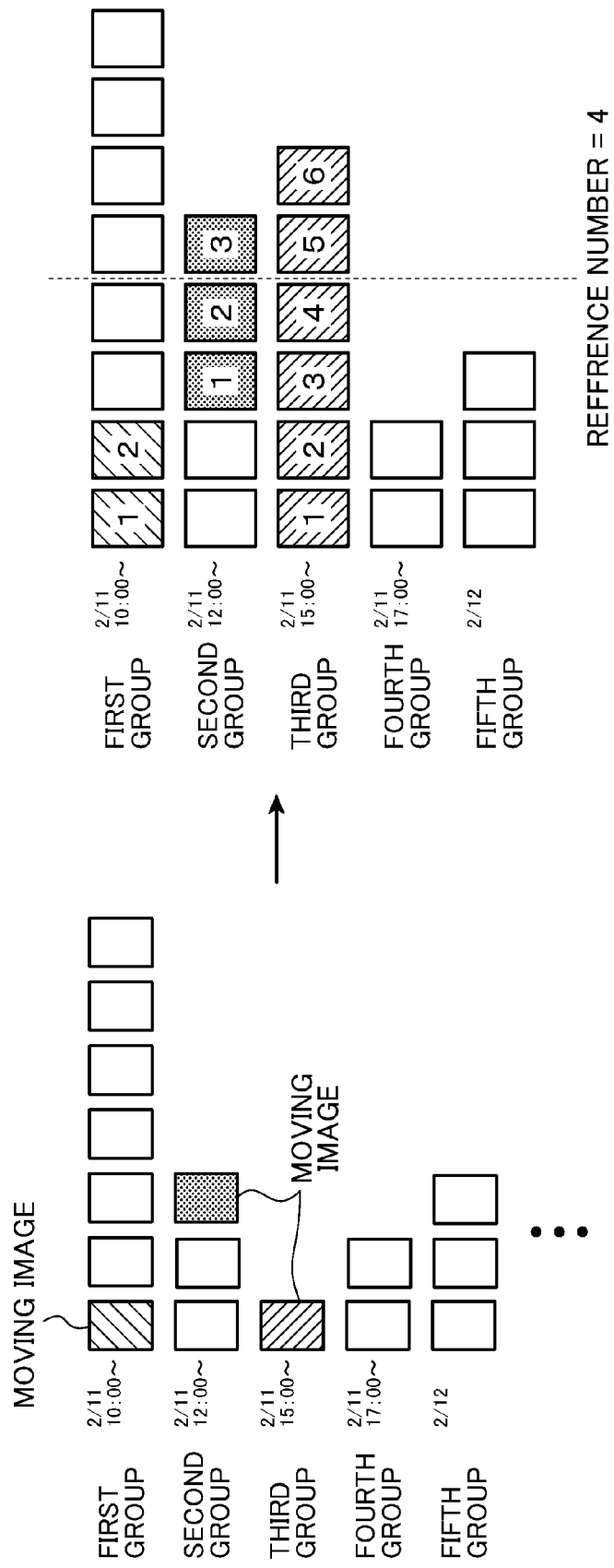
FIG. 34 is a view for explaining an example showing how groups in which the total number of images exceeds a reference number of images are each divided into two or more groups.

Alternatively, a group in which the total number of images exceeds the reference number of images may be divided into two or more groups. Suppose that after frame images are extracted by group from moving images, the total number of still images and frame images exceed four, the reference number of images, in the first to the third groups as illustrated in FIG. 34. Note that the frame images are numbered in FIG. 34. The first group contains a total of eight images; the second group contains a total of five images; the third group contains a total of six images. In this case, the fifth and other still and frame images to follow in each of the first to the third groups are classified into other groups.

Figure 35:
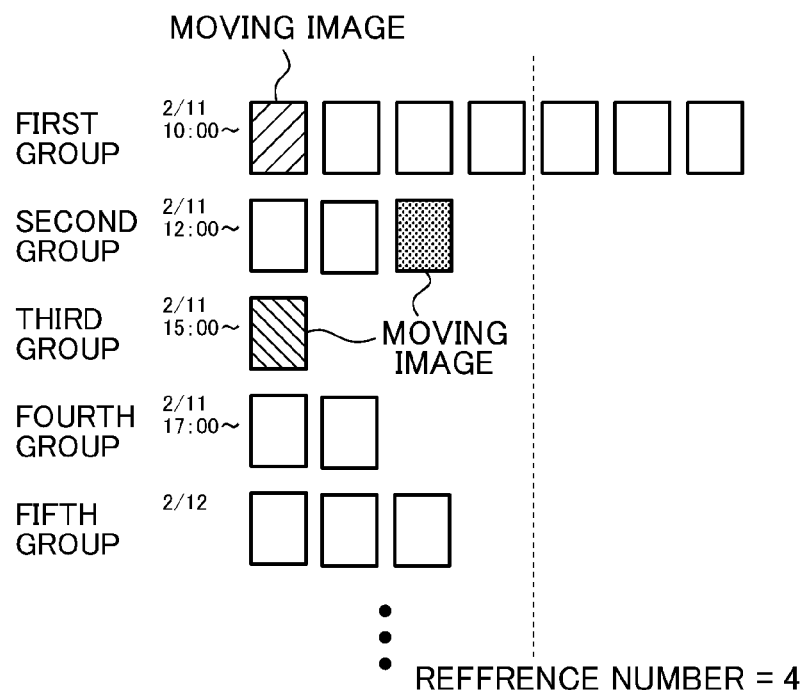
FIG. 35 is a view for explaining an example of a screen displaying a result of classification of images into groups and a line (border line) indicating a reference number of images.

Alternatively, the user may determine a selectable number of frame images that may be extracted from each moving image considering the reference number of images. As illustrated in FIG. 35, the screen displays a result of classification of images into groups and a line (border line) indicating the reference number of images. For example, since the third group contains a single moving image, a maximum of four frame images may be extracted. Accordingly, the user may select a number of frame images to be extracted from a range of one to four.

Alternatively, when the user does not consider the reference number of images so that the extractable number of frame images may be selected from five or more and the total number of still images and frame images in a group exceed the reference number, the group may be divided into two or more groups.

The frame image extractor 24 may determine the number of frame images that may be extracted from each moving image according to the number of pages designated by the user.

Figure 36:
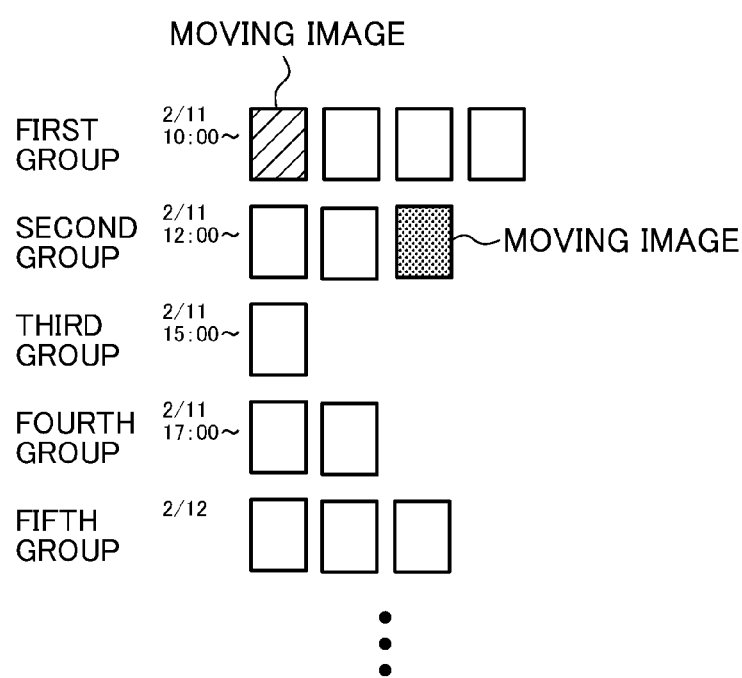
FIG. 36 is a view for explaining an example of images classified into a first group to a fifth group.
Figure 37:
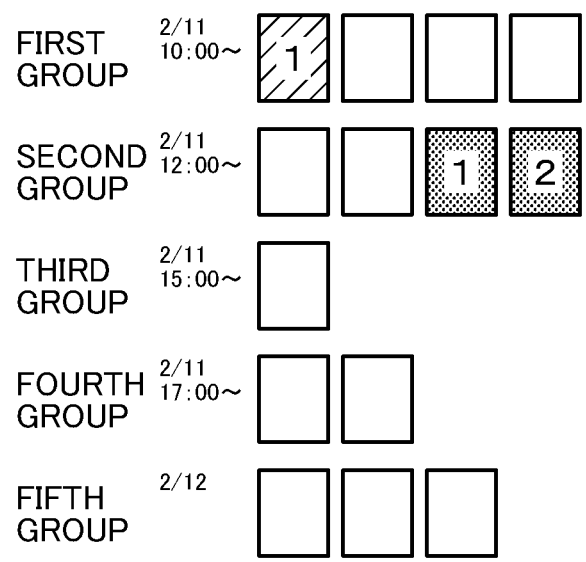
FIG. 37 is a view for explaining an example how frame images have been extracted from moving images only considering a reference number of images.

Suppose, for example, that the user designates production of a photograph album containing seven pages using images classified into the first to the fifth groups as illustrated in FIG. 36. Suppose also that the reference number of images is four. Then, when simply the reference number of images is only considered, the number of pages of the photograph album is five because, as illustrated in FIG. 37, one frame image is extracted from the moving image of the first group, and two frame images are extracted from the moving image of the second group.

Therefore, the numbers of frame images extracted from each moving image is increased according to the number of pages designated by the user, so that, for example, two frame images are extracted from the moving image of the first group, and five frame images are extracted from the moving image of the second group as illustrated in FIG. 38A. Then, as illustrated in FIG. 38B, the first group is divided into a group containing two frame images and another group containing three still images, while the second group is divided into a group containing two still images and two frame images and another group containing three frame images. Thus, the photograph album has seven pages as designated by the user.

The number of frame images to be extracted from each moving image and how a group containing a number of images exceeding the reference number of images is divided may be determined in any manner as appropriate within an allowable range according to the number of pages designated by the user and the reference number of images.

The layout determining unit 26 determines the layout of frame images and still images by group based on the analysis information and/or relationship information and produces and outputs layout data. For example, when a photograph album is to be produced, each group is assigned one page, and the layout of the page is determined based on the analysis information and/or relationship information. Layout data is stored in the image recorder 18.

The image arranging unit 28 reads the frame image data and still image data from the image recorder 18 based on the layout data, arranges the images, and produces and outputs the arrangement data. The arrangement data is stored in the image recorder 18.

Next, the operation of the image processing device 10 of the invention implementing the image processing method of the invention will be described.

FIG. 3 is a flowchart indicating an example of the flow of the image processing method of the present invention.

First, data (moving image/still image data) of material moving images and still images is entered from the image data input unit 12 (step S10). The entered moving image/still image data is recorded once in the image recorder 18 as material image data.

The material image data (moving image/still image data) is read by the image grouping unit 19 from the image recorder 18 and classified into groups according to a given condition (event) (step S12).

For example, as illustrated in FIG. 4A, where images are classified by shooting date, one moving image and six still images shot from 10:00 to 12:00 on February 11th are classified into the first group; two still images and one moving image shot from 12:00 to 15:00 on the same day are classified into the first group; one moving image shot from 15:00 to 17:00 on the same day is classified into the third group; two still images shot from 17:00 to 24:00 on the same day are classified into the fourth group; and three still images shot on the following day are classified into the fifth group.

Next, the moving image/still image data classified into groups are analyzed by group by the image analyzer 22 to determine whether moving images and still images are mixed therein (step S14). Processing is performed in manners specific to cases where moving images and still images are mixed ("mixed" in the step S14), cases where only moving images are contained ("moving images only" in the step S14), and cases where only still images are contained ("still images only" in the step S14), respectively.

In the example illustrated in FIG. 4A, moving images and still images are mixedly contained in the first and the second groups ("mixed" in the step S14); only moving images are contained in the third group ("moving images only" in the step S14); and only still images are contained in the fourth and fifth groups ("still images only" in the step S14). Processing is separately performed for the respective groups accordingly.

Where moving images and still images are mixedly contained ("mixed" in the step S14), the still image analyzer 22a analyzes the still image data contained in the group to obtain still image analysis information, so that the maximum number of frame images that can be extracted from a moving image is calculated.

Next, the moving image analyzer 22b analyzes the moving image data contained in the group to obtain analysis information on moving images. The still image analyzer 22a and/or the moving image analyzer 22b compares their analysis information to obtain relationship information. Further, the representative values of the respective relationship information are calculated by weighting the analysis information.

Subsequently, the frame image extractor 24 determines the number of frame images to be extracted from each moving image without exceeding the maximum extractable number of frame images based on the analysis information and/or the relationship information and extracts a determined number of frame images. The still images and the moving images contained in the same group (event) highly likely represent the same scene and, therefore, frame images as different in direction of the subject, scene, composition, etc. from the still images as possible are preferably extracted.

For example, in the example illustrated in FIG. 4B, with a precondition that the maximum number of images of the first group is 8, the still image data of the six still images of the first group is analyzed, and, first, the maximum number of frame images is calculated as 2. Where none of the six images shows the front of a subject, obtained are analysis information that there are no images representing the front of a subject and relationship information that images representing the front of a subject are lacking.

Then, according to the relationship information that images representing front images of a subject is lacking, frame images representing front images of the subject are extracted in a number that is 2 in maximum, i.e., the maximum extractable number of frame images depending on the length of the moving image (step S16). Thus, when the moving image is long, the same number of frame images as the maximum extractable number are extracted but when the moving image is short in length as in the case of the second group shown in FIG. 4B, only three images are extracted within the maximum extractable number according to the analysis information and relationship information (e.g., number of scenes, number of detected movements), and, therefore, in some cases only five images in total including still images may be extracted. The analysis information and the relationship information on moving images may be carried over in the extracted frame images.

One may extract frame images representing same scene (composition) and the same subject but showing the subject face or body directed in slightly different directions such that when these images are arranged, they will show a movement as illustrated in FIG. 5. Such arrangement showing a movement, where possible, is an effective layout.

Figure 6:
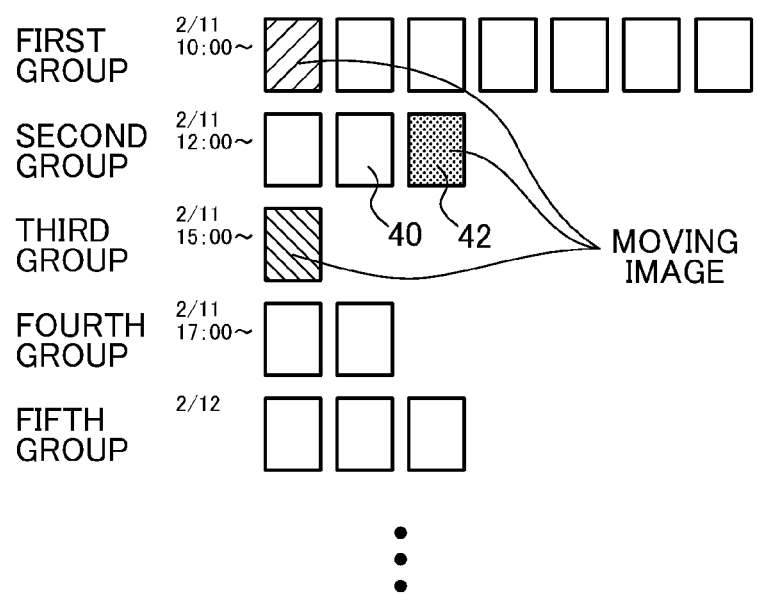
FIG. 6 is a view for explaining an example containing both still images and moving images and where the still images and moving images are highly related.

In another example, as in the case of the second group illustrated in FIG. 6, when a still image 40 shows a person A and a moving image 42 shows the person A, a frame image showing the person A differently than is shown in the still image 40 may be preferentially extracted from the moving image 42. Alternatively, frame images considering the shooting location (shooting place) in lieu of images showing the person A may be extracted using location information such as information obtained using GPS and the like. Further, frame images showing scenes different in composition, colors, etc. from the still image 40 may be extracted.

Alternatively, frame images may be extracted considering the resolution of images.

Figure 39:
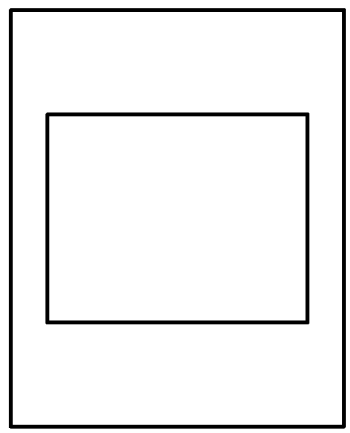
FIG. 39 is a view for explaining an example of layout where a single frame image is enlarged and positioned at the center of a page.
Figure 40:
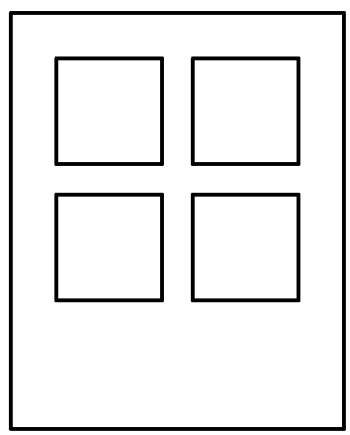
FIG. 40 is a view for explaining an example showing how the number of frame images is increased to four, and the display size of each of the images is reduced.

When only one frame image is extracted from one moving image contained in a group such as the third group shown in FIG. 6, for example, a resulting layout is one as illustrated in FIG. 39, where one frame image is enlarged and positioned in the center of a page. In this case, no problem is posed when the frame image extracted from the moving image has a high resolution. When the frame image is one extracted from a low-resolution moving image acquired using, for example, a camera function provided in a portable telephone, a printout produced therefrom will have a poor image quality. Therefore, when a moving image has a resolution lower than a given resolution and the total number of still images and frame images contained in a group is smaller than a given number, an adjustment is preferably made by increasing the number of frame images to be extracted from the moving image, so that the display size of one image is smaller than a given size in consideration of the image quality of printouts. When the number of frame images is increased to four, for example, as illustrated in FIG. 40, the size of each image is reduced, which necessarily improves the image quality of the resulting printouts.

Alternatively, frame images may be extracted considering the number and size of subject persons.

When, for example, a moving image contains many persons or the size of persons contained in a moving image is small even when only a few persons are contained in the moving image, the display size of each image is small if a large number of frame images are extracted from the moving image, making it difficult to recognize the persons. When the size of persons contained in a moving image is smaller than a given size, adjustment is preferably made by reducing the number of frame images extracted from the moving image so that the persons are displayed in sizes not smaller than a given size for easy recognition of the persons.

Alternatively, frame images may be extracted considering the aspect ratio of images.

The aspect ratio of a moving image varies depending on, for example, the way a camera is held (vertically or horizontally) and the shooting mode (full high vision 1920×1080; VGA 640×480). Accordingly, it is preferable that, for example, the number of frame images to be extracted from a moving image having an aspect ratio required for a layout of images is increased while the number of frame images to be extracted from other moving images is reduced according to the conditions for producing a photograph album or an electronic album. When, for example, many portrait-aspect frame images are required, the number of frame images to be extracted from portrait-aspect moving images is increased, while the number of frame images to be extracted from landscape-aspect moving images is reduced.

Alternatively, in lieu of extracting frame images in size corresponding to the whole region of a moving image as displayed on the screen, a region or a part of a moving image as displayed on the screen with which frame images are to be extracted may be determined, and frame images may be extracted with a determined region.

Figures 41A, 41B, 41C:
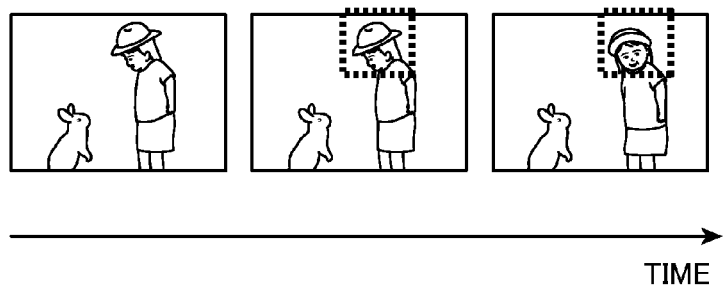
FIGS. 41A to 41C respectively illustrate a moving image containing a child and a rabbit, how a given region containing the face of the child is extracted as a frame image before the face moves and after the face moves.

When, for example, a moving image contains a child and a rabbit, and the child's face makes a particularly great movement (i.e., the direction of the face changes greatly) as illustrated in FIG. 41A, a given region including the child's face may be determined as region with which images are extracted from the moving image so that a given region surrounded by a dotted line in FIG. 41B including the child's face before the face moves is extracted as a frame image 1 and a given region surrounded by a dotted line in FIG. 41C including the child's face after the face moves as time passes is extracted as a frame image 2.

Figures 42A, 42B:
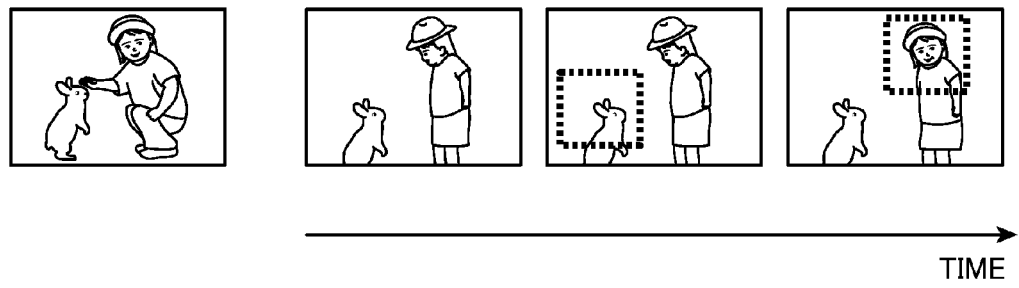
FIG. 42A illustrates a still image showing a child and a rabbit.
FIG. 42B is a view for explaining an example showing how given regions respectively containing the child and the rabbit, both belonging to the same group, are extracted as frame images from a moving image containing the child and the rabbit.

When, for example, a still image in the same group contains the child and the rabbit as illustrated in FIG. 42A and the moving image in the same group also contains the child and the rabbit as illustrated in FIG. 42B, given regions each containing the faces of the child and the rabbit may be determined as regions for extracting images from the moving image to extract the given region including the child's face and the given region including the rabbit's face each surrounded by a dotted line in FIG. 42B as frame images.

When extraction of frame images from a moving image in a group is completed, the representative values of the relationship information of the moving image and the frame images are compared with the representative value of the relationship information of the still images (step S18). When there is a close relationship between relationship information of the moving image and the frame image and relationship information of the still images (for example, the difference between their representative values is less than plus or minus 10) ("relationship exits" in the step S18), the layout is determined considering the relationship, and the layout data is outputted. The layout data is recorded in the image recorder 18 and entered in the image arranging unit 28, where the layout data is combined with frame images and still images to produce and output arrangement data (step S20). The outputted arrangement data is recorded in the image recorder 18.

Figure 7:
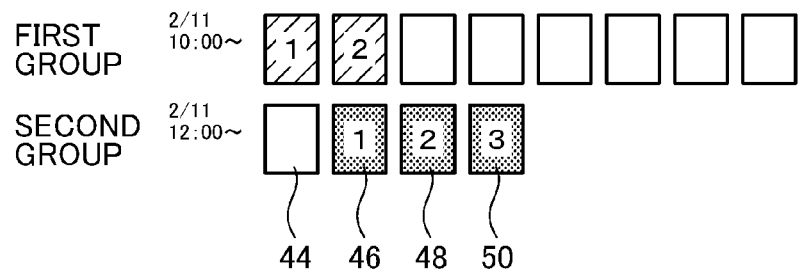
FIG. 7 is a view for explaining an example where frame images have been extracted from the moving images.
Figure 8:
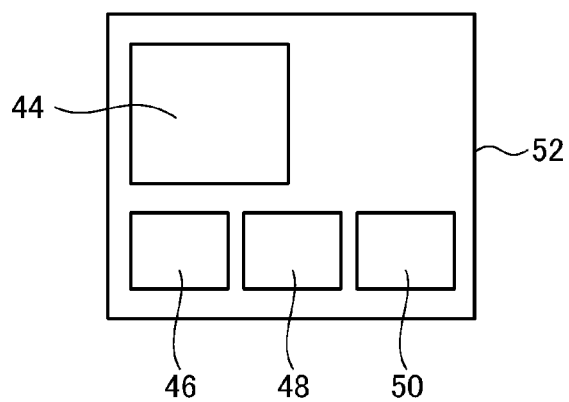
FIG. 8 is a view for explaining an example of layout containing both still images and moving images and where the still images and moving images are highly related.

In the second group illustrated in FIG. 7 given by way of example, the relationship information of a still image 44 and frame images 46, 48, and 50 are compared and when it was determined that there is a close relationship between the still image 44 and the frame images 46, 48, and 50, a layout may be made as illustrated in FIG. 8 where the frame images 46, 48, and 50 may be arranged beneath a large still image 44.

Figure 9:
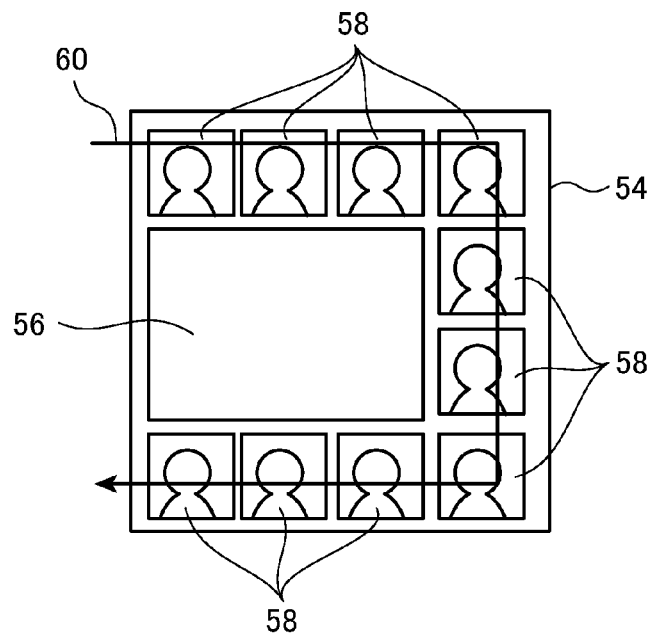
FIG. 9 is a view for explaining another example of layout containing both still images and moving images and where the still images and moving images are highly related.

In another example of layout, a layout may be such that frame images 58 are arranged chronologically around a still image 56, as in a layout 54 illustrated in FIG. 9.

Figure 10A:
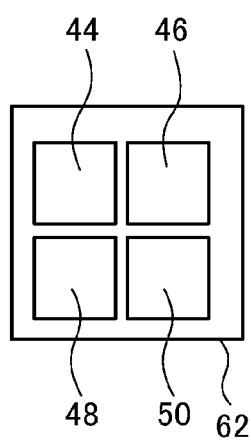
FIGS. 10A and 10B are views each for explaining an example of layout containing both still images and moving images and where the still images and moving images are related to a lower degree.
Figure 10B:
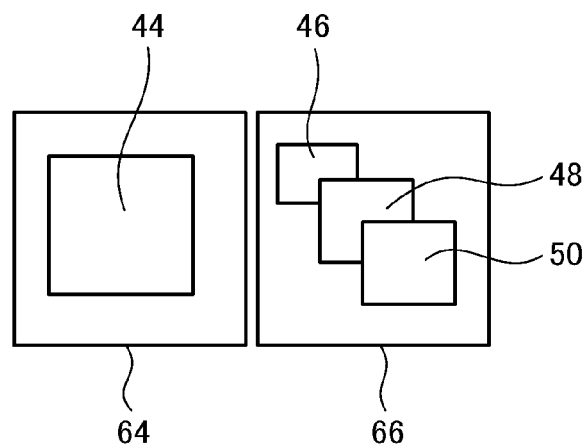

When, in the step S18, the relationship between relationship information of a moving image and frame images and relationship information of a still image is not close (for example, the difference between their representative values is greater than plus or minus 10) ("no relationship" in the step S18), layout data is outputted such that the still image 44 and the frame images 46, 48, and 50 are simply arranged without considering the relationship information as illustrated in FIG. 10A, or a layout 64 where the still image 44 is placed in one page while the frame images 46, 48, and 50 are arranged in another page as in a layout 66 as illustrated in FIG. 10B.

The layout data is recorded in the image recorder 18 and entered in the image arranging unit 28, where the layout data is combined with frame images and still image to produce and output arrangement data (step S22). The outputted arrangement data is recorded in the image recorder 18.

In cases where judgment "moving image only" is made in the step S14, the moving image analyzer 22*b* analyzes the moving image data to obtain the analysis information. The frame image extractor 24 extracts optimal frame images in a number not exceeding a maximum extractable number predetermined for the first group based on the analysis information (step S24).

The third group illustrated in FIG. 4A, for example, contains only one moving image, and the moving image analyzer 22*b* analyzes the moving image data to obtain the analysis information. Now, when, for example, the user enters an instruction that one frame image be extracted for one scene, and supposing that the third group contains a moving image that can be divided into six scenes by composition, one frame for each scene is extracted. Thus, six frame images are extracted as illustrated in FIG. 4B.

Figure 11A:
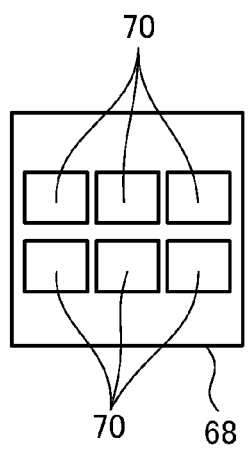
FIGS. 11A to 11C are views each for explaining an example of layout where only frame images extracted from a moving image are arranged.
Figure 11B:
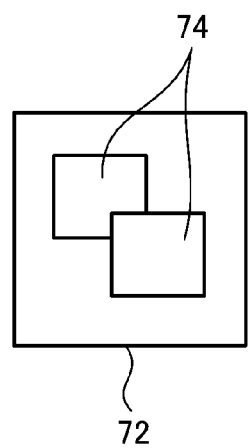
Figure 11C:
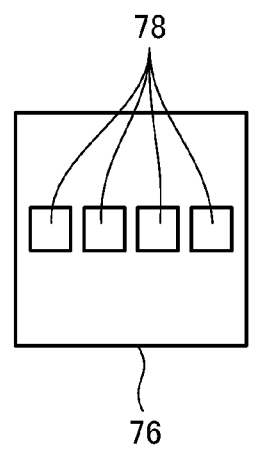

The frame images that are extracted, for example, at given time intervals, are arranged into a layout 68 where frame images 70 are arranged evenly as illustrated in FIG. 11A and the corresponding layout data is outputted. When a moving image contains a close-up portion, a layout 72 may be made where frame images 74, one showing a zoomed-in image and another a zoomed-out image that follows, are arranged so as to overlap each other as illustrated in FIG. 11B. When extracted frame images successively show a child or like subject, extracted framed images 78 may be arranged into a layout 76 where they are arranged in a given direction.

As in the case where the "no relationship" judgment is made in the step S18, the layout data is recorded in the image recorder 18 and entered in the image arranging unit 28, where the layout data is combined with frame images to produce and output arrangement data (step S22). The outputted arrangement data is recorded in the image recorder 18.

When the "still image only" judgment is made in the step S14, the still image analyzer 22a analyzes the still image data to obtain the analysis information. The layout determining unit 26 produces and outputs the still image layout data based on the still image analysis information. The layout data is recorded in the image recorder 18 and entered in the image arranging unit 28, where the layout data is combined with still image to produce and output arrangement data (step S26). The outputted arrangement data is recorded in the image recorder 18.

Next, referring to FIG. 12, we will describe a case where the arrangement data is recomposed according to user instruction after it is once produced.

There may be a case where the user desires to recompose some pages of the arrangement data of, for example, a photograph album once produced by the image processing method of the present invention. Now, we will consider a case where, for example, image data of a group of images illustrated in FIG. 12A is classified into groups illustrated in FIG. 12B to produce the arrangement data of a photograph album illustrated in FIG. 12C by the image processing method of the invention. Suppose that the user desires to add more frame images from a moving image in a second page 80, the user operates the operating unit 19 to give recomposition instruction for recomposing the second page 80. Thus, the operating unit 16 outputs recomposition instruction.

The recomposition instruction is entered in the layout determining unit 26 and, for example, a plurality of layout candidates (templates 82, 84) are displayed on the image display 14, from which a layout is selected by the user, and an instruction for re-extracting frame images that suit the selected layout is outputted.

The re-extraction instruction is entered in the frame image extractor 24, and frame images that suit the selected new layout are extracted, registered in the image register 18 and entered in the image arranging unit 28 to produce and output arrangement data for a recomposed page (second page 80). The outputted arrangement data is recorded in the image recorder 18.

Recomposition of a page may be effected not only by template selection by the user but in such a manner that the user designates the number of frame images to be extracted from a moving image so that template selection is automatically made according to the number of frame images.

The arrangement data produced by the image processing device 10 is printed by a printer, not shown, and printed pages are booked by a bookbinding device, not shown, to produce a photograph album.

EXAMPLES

Next, the image processing method of the invention will be described referring to specific examples.

Example 1

Figure 13:
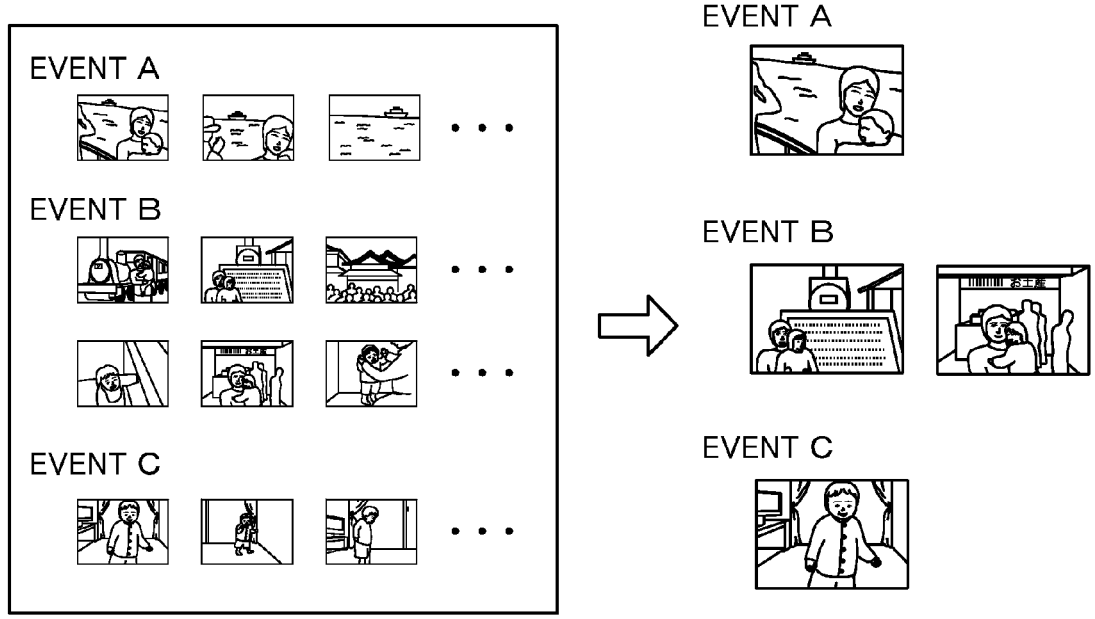
FIG. 13 is a view for explaining an example where recommended images are extracted from moving images and still images classified into events.

FIGS. 13 and 14 illustrate examples where recommended images are extracted by event (group).

First, as illustrated in FIG. 13, moving images and still images are classified into groups (event A, event B, and event C). In this case, frame images are extracted from a moving image according to the analysis information and/or the relationship information.

Next, recommended images are extracted from among images classified into events according to the analysis information such as, for example, the number of images in an event, the number of subject persons, the size of a subject, the brightness of the whole image, and vividness of the whole image.

Figure 14A:
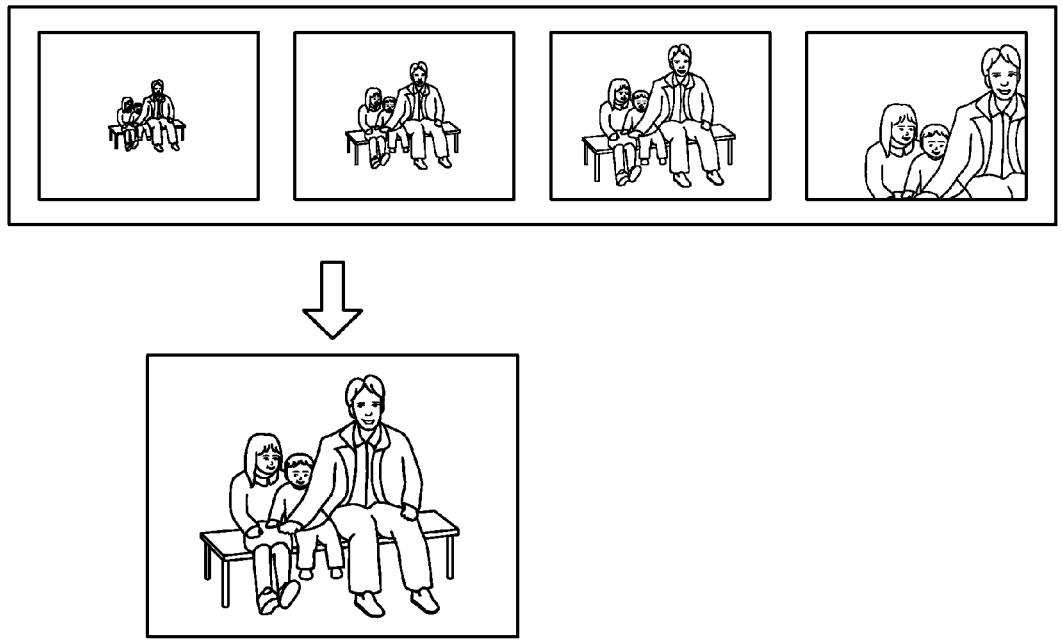
FIG. 14A is a view for explaining an example where classification is effected by similar scene and a recommended image is determined and extracted.

In an example of extraction of recommended images, classification is made by scene showing persons and recommended images are selected according to the position of faces of persons (whether directed toward the center of the image) and the size of faces (in proportion to the whole image, etc.) as illustrated in FIG. 14A.

Figure 14B:
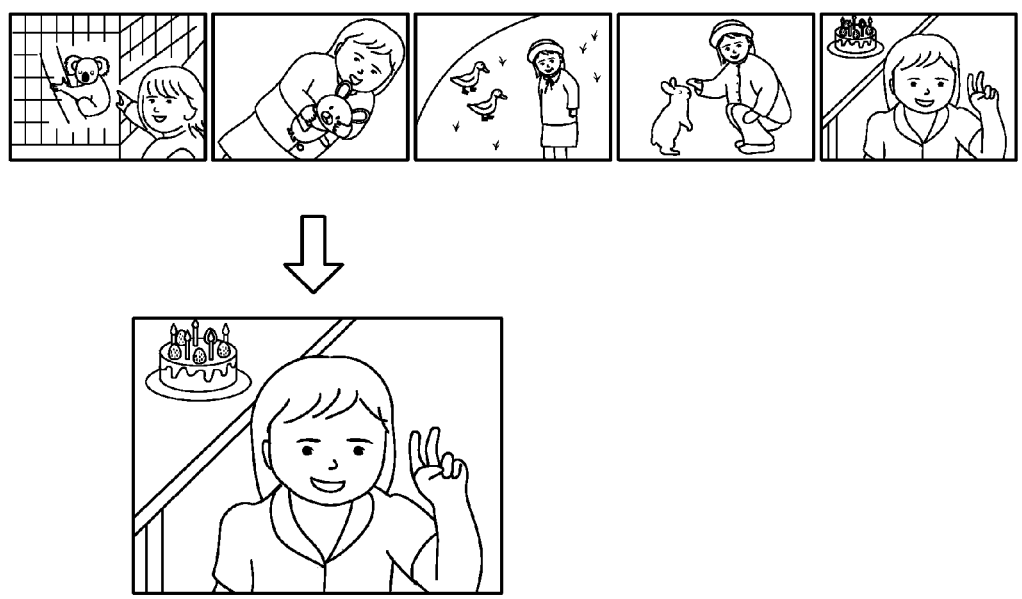
FIG. 14B is a view for explaining an example where classification is effected with respect to designated person and a recommended image is determined and extracted.

Further, as illustrated in FIG. 14B, extraction may be made in such a manner that classification is effected according to a designated person and the recommended images are determined according to position of a person's face, size of his/her face, facial expression such as smile, and brightness (luminance).

The extracted recommended images (frame images or a still image) are arranged according to the analysis information and/or the relationship with other extracted recommended images, i.e., according to the respective analysis information and/or relationship information.

Example 2

FIGS. 15 to 19 illustrate examples where layout is effected using detection of faces and vanishing points.

Figure 15:
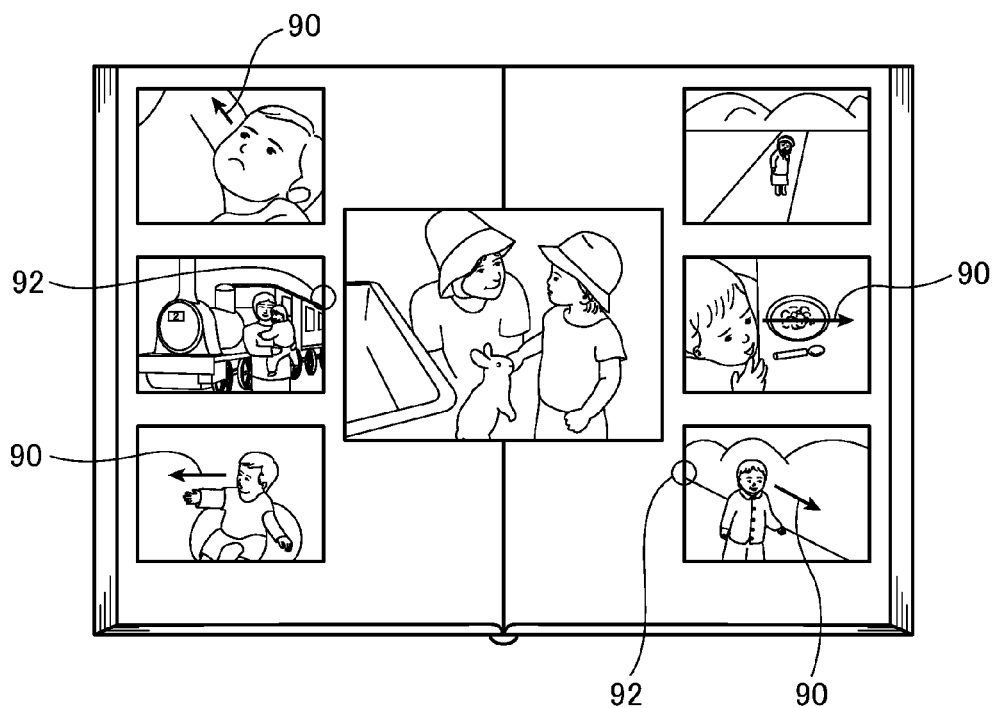
FIG. 15 is a view for explaining an example of layout before a face and a vanishing point are detected.

As illustrated in FIG. 15, for example, a still image is selected from among images classified into groups and placed at the center of two spread opposite pages of a photograph album while frame images are arranged around the still image. The layout shown in FIG. 15, however, does not consider the contents of images, so that face directions 90 and vanishing points 92 in the respective images are inconsistent and thus the layout is inconsistent as a whole.

Figure 16:
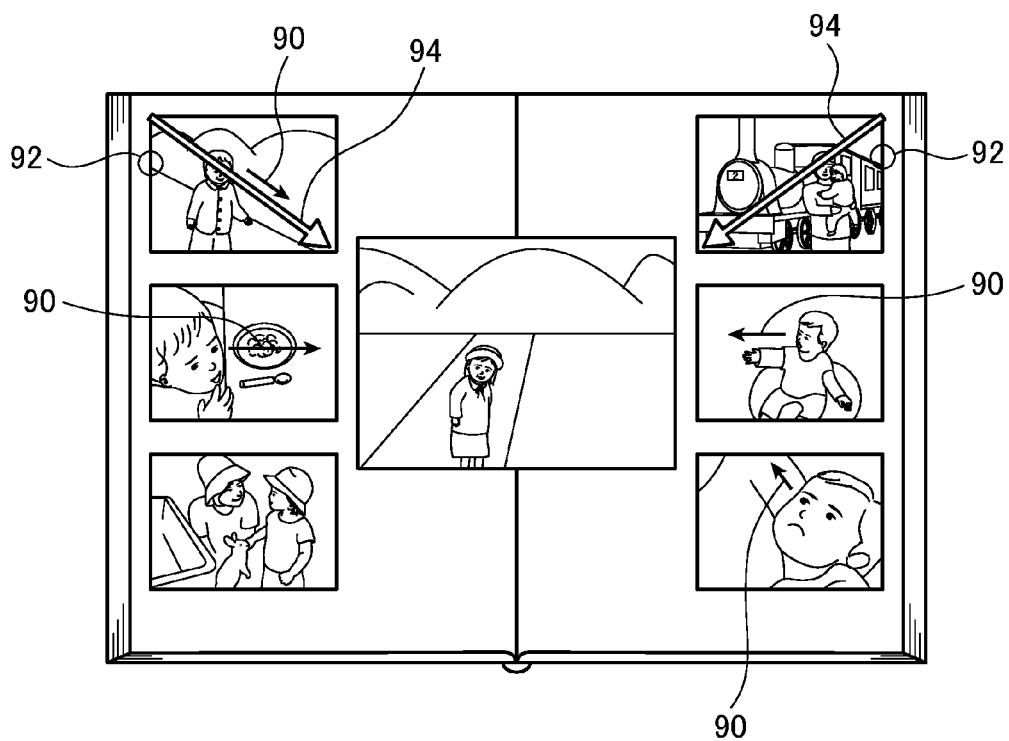
FIG. 16 is a view for explaining an example of layout where a layout is effected using a face and a vanishing point.

When a layout is made using the subjects' face directions, the vanishing points, and the relationship information among the analysis information of the still image and the frame images, the resulting layout has a depth at the center and images are placed around the central image considering the directionality of the images based on the vanishing points 92 and face directions 94 as illustrated in FIG. 16. In such layout, images are arranged with a good balance.

Figure 17A:
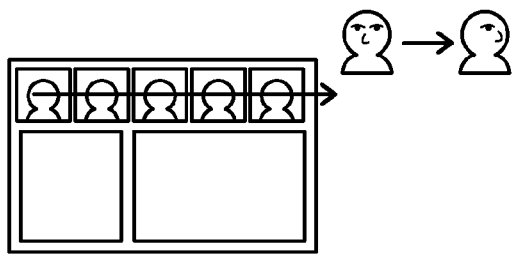
FIGS. 17A and 17B are views for explaining an example where frame images showing a change in face direction are extracted and arranged in a given direction.
Figure 17B:
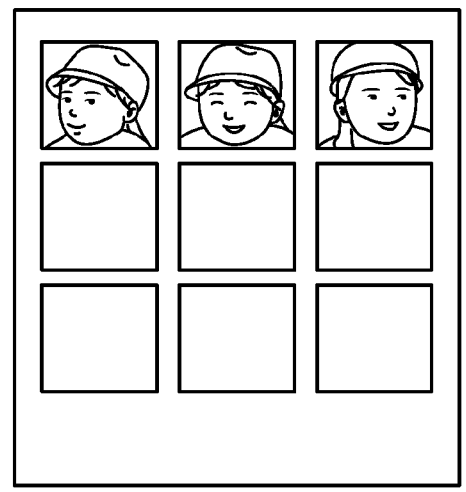

In other examples, faces are detected from a moving image as illustrated in FIGS. 17A and 17B, and the face directions in the analysis information and the relationship information are used to extract frame images showing variation in face direction and arrange the extracted images in a given direction. In such layout, the images are arranged so as to show the variation in subject's face direction.

Figure 18:
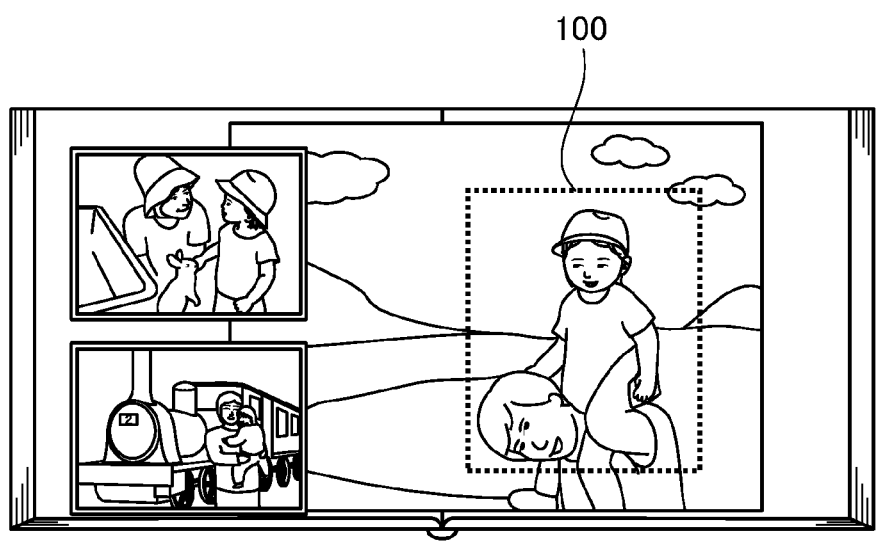
FIG. 18 is a view for explaining an example of layout where another image is superposed so as not to hide a major subject.

In still another example, a major subject 100 in a group is detected as illustrated in FIG. 18, and the positions of the major subject in the analysis information and the relationship information are used to superpose other images so as not to hide the major subject 100. In the resulting layout, the major subject 100 is not hidden and the images are superposed effectively.

Figure 19:
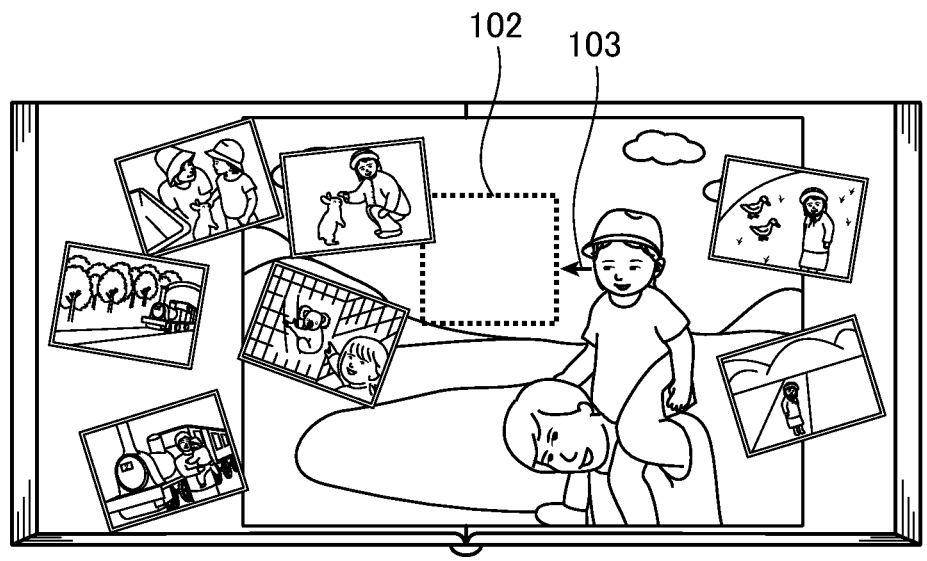
FIG. 19 is a view for explaining an example of layout where a given space located in a direction of a subject's face is secured free of other images.

Further, as illustrated in FIG. 19, a layout may be made so that other images are not placed in a space 102 lying in a subject's face direction 103 using the subject's face direction in the analysis information and the relationship information.

In the resulting layout, no images are placed close to and in the direction of the subject's face and thus the image does not give an oppressive feeling.

Example 3

Examples are shown in FIGS. 20 to 24 where frame images are extracted from a moving image. The examples illustrated in FIGS. 20 to 24 show cases where most desirable frame images are extracted. Unless otherwise described, after frame image extraction, layout is effected and frame images are arranged similarly to the cases of Examples 1 and 2.

Figure 20A:
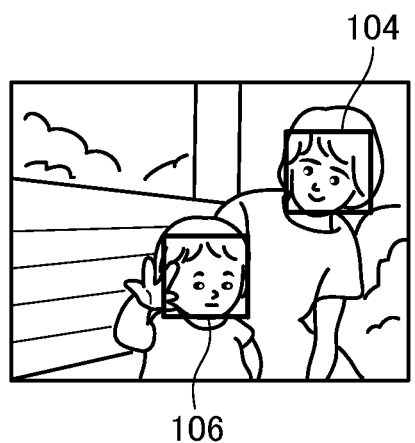
FIG. 20A is a view for explaining an example of layout where the faces of target persons are recognized but their eyes are not directed toward the camera.
Figure 20B:
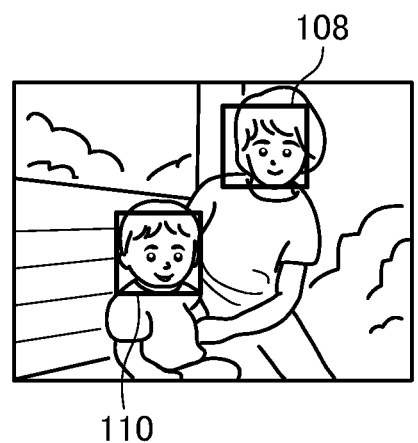
FIG. 20B is a view for explaining an example of layout where their eyes are directed toward the camera and smiles are observed.

When faces 104 of target persons are recognized but their eyes are not directed toward the camera as illustrated in FIG. 20A, they are not most desirable. Therefore, the moving image is analyzed to extract therefrom a frame image showing their smiles 108, 110 with their eyes directed toward the camera as illustrated in FIG. 20B as a most desirable image.

Figure 21:
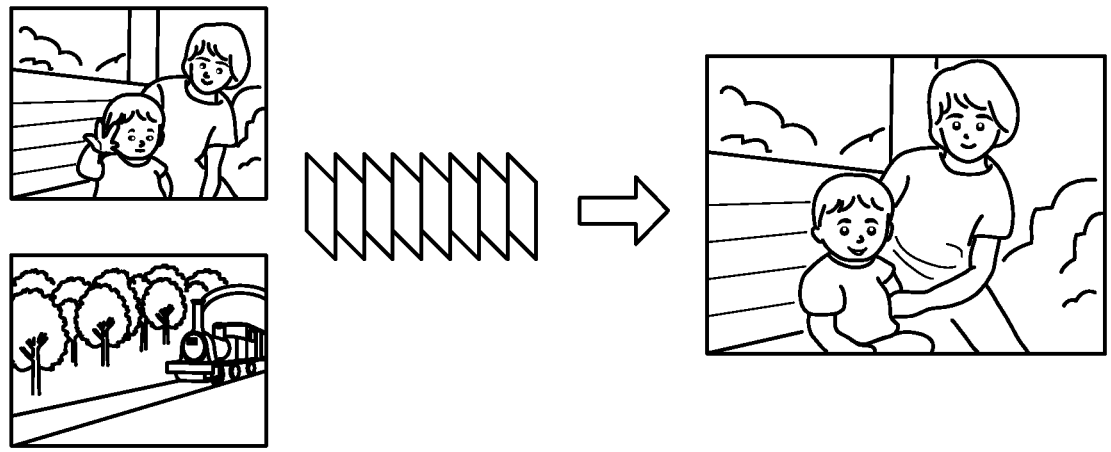
FIG. 21 is a view for explaining an example where a recommended image is automatically extracted from a moving image.
Figure 22:
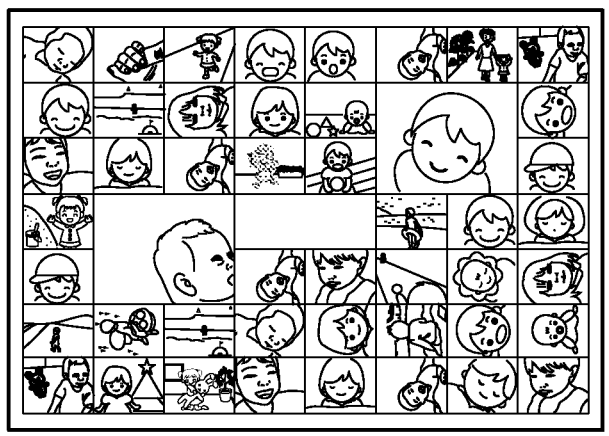
FIG. 22 is a view for explaining an example of layout for shuffle print.
Figure 23:
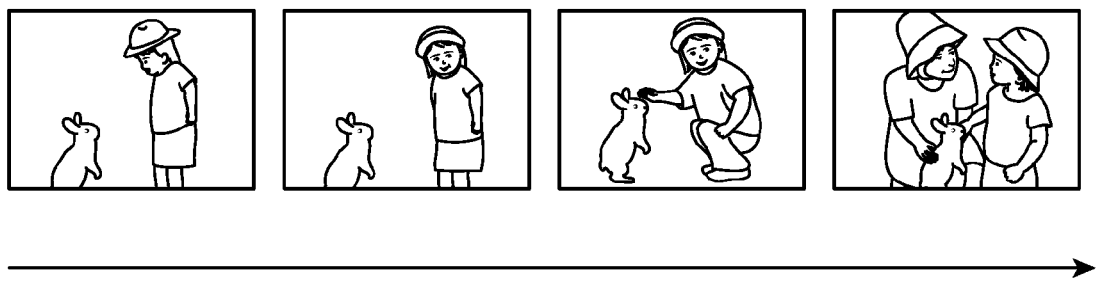
FIG. 23 is a view for explaining an example of layout where best shots are arranged chronologically to express a movement.

In other examples, recommended frame images are automatically extracted from a moving image (most desirable images are extracted) as illustrated in FIG. 21, most desirable images extracted from a moving image are randomly arranged in a shuffle print layout as illustrated in FIG. 22, and most desirable images are chronologically arranged to show a movement as illustrated in FIG. 23.

Figure 24:
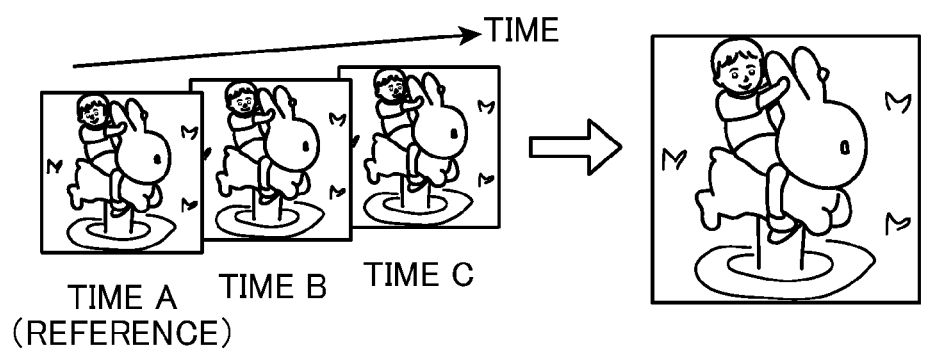
FIG. 24 is a view for explaining an example where a high-resolution frame image is produced from a plurality of frame images.

Further, as illustrated in FIG. 24, frame images, each shot at time A, B, and C, are extracted, similarity judgment is made to determine similarity to a reference frame image (time A), and image synthesis is made to produce a single high resolution image from a plurality of frame images.

Example 4

Figure 25:
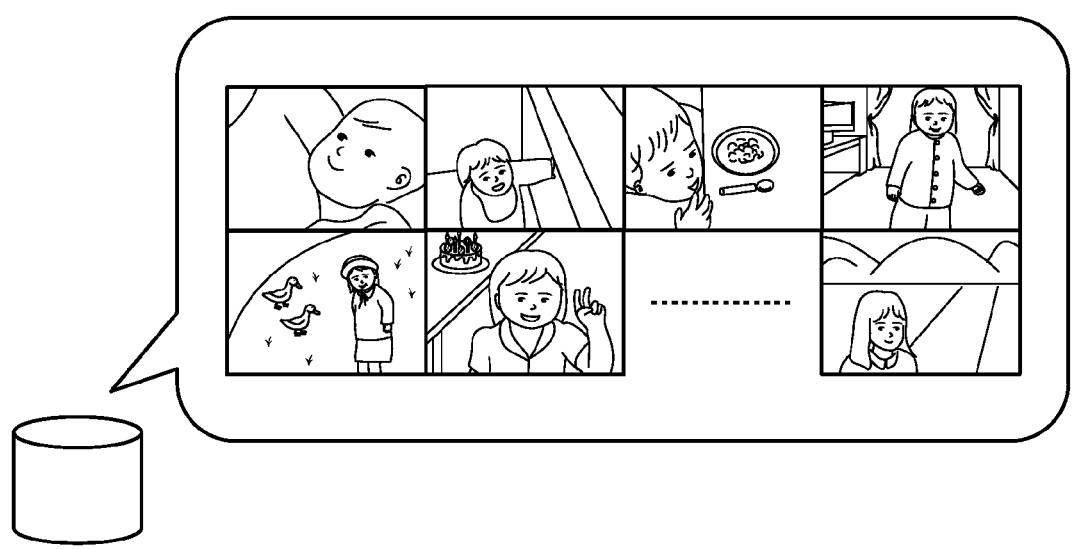
FIG. 25 is a view for explaining an example where images showing a given person are extracted from a group of numerous images.
Figure 26:
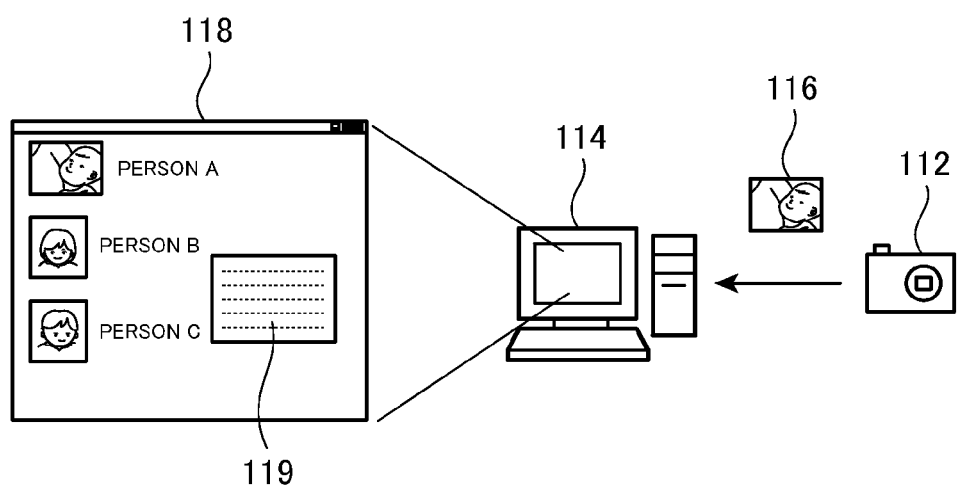
FIG. 26 is a view for explaining an example of registration and classification processing.
Figure 27:
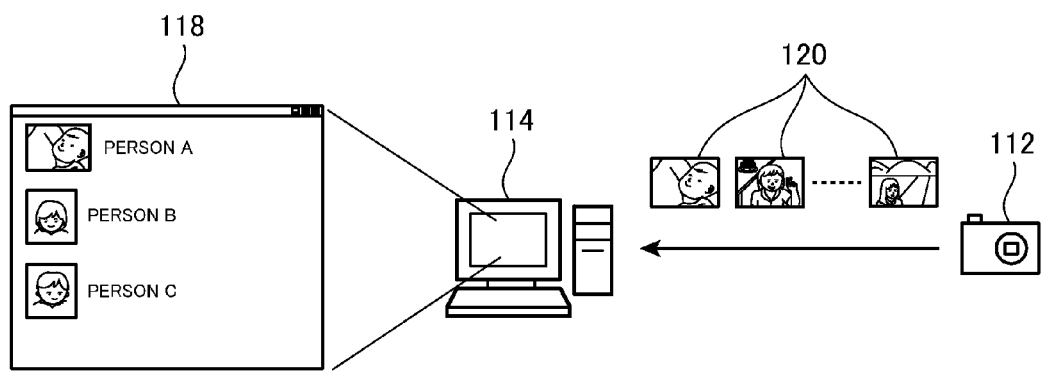
FIG. 27 is a view for explaining another example of registration and classification processing.

FIGS. 25 to 27 illustrate examples of classification in a case where there is a chronological variation related to the same person.

There may be a case, for example, where images showing a person from his/her infancy through childhood to adulthood are to be extracted from among a large number of images. However, with current face recognition technologies, making judgments with images shot during a subject's infancy and images shot from infancy to adulthood, when the face undergoes a great change, are difficult; for example, even when a face during babyhood has been registered, recognizing a person in images shot in infancy onward as an identical person is difficult. Therefore, when still image data 116 is loaded from a digital still camera 112 into a personal computer (referred to as PC below) 114 as illustrated in FIG. 26, and classification into groups is made using an image processing application, a message 119 is given on an editing screen 118 that there is no image showing a face identical to the face of a registered person.

When the message 119 is given although a person represented in the still image data 116 loaded in the PC is identical to a registered person, the person represented in the still image data 116 is newly registered to reconstruct the recognition judgment processing. When a person's face is additionally registered as illustrated in FIG. 27, faulty judgment does not occur and there is no need of additional registration for the time being, and still image data 120 of a few images need be only occasionally registered as the person grows. When the features of a person's face do not change much as after he/she has grown up, there is also no need of additional registration.

Thus, even when there is a chronological change in the same person, registration of only a few images of face representing each growth period suffices to enable classification into groups without the possibility of faulty judgment.

Example 5

Figure 28:
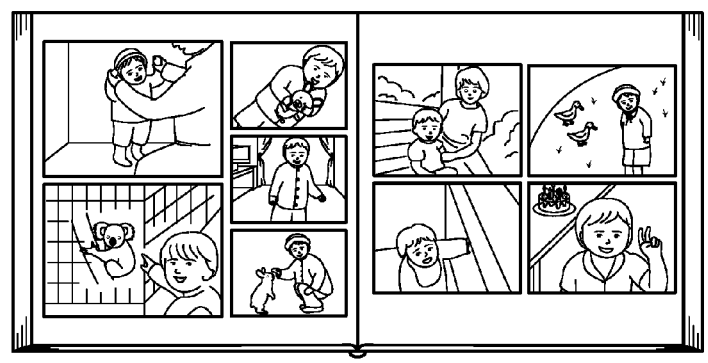
FIG. 28 is a view for explaining an example of layout in a photograph album.
Figure 29:
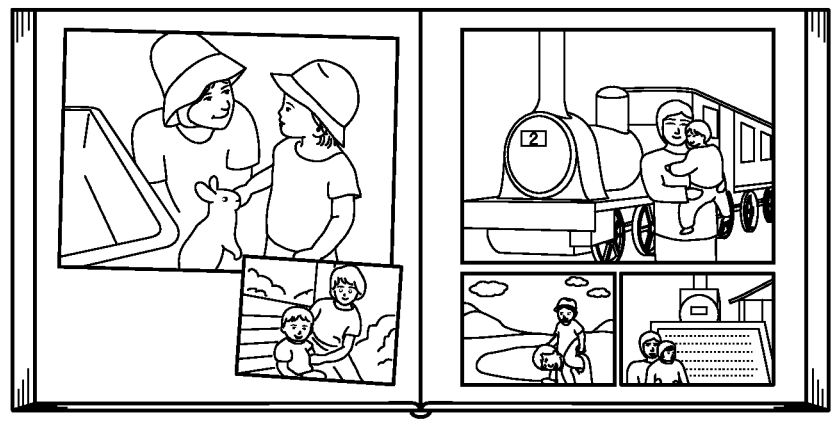
FIG. 29 is a view for explaining another example of layout in a photograph album.

FIGS. 28 and 29 illustrate examples where face recognition is performed with a still image and frame images, and layout and arrangement of images are achieved automatically. Image extraction is performed in such a manner that, for example, as in the case of the above example 3, most desirable images are extracted from frame images extracted from a moving image and still images.

As illustrated in FIG. 28, when, for example, a photograph album is to be produced as a present to grandparents of a grandchild, a layout to be made may be about the grandchild. When a photograph album is to be produced for a family to view, a layout may be made such that, as illustrated in FIG. 29, the family (father, mother, and a child) and landscapes are shown evenly. Further, in a photograph album using images shot during a trip taken with a friend, a layout for the user may mostly include images showing the user while when a photograph album is produced as a present for the friend, a layout for the user may mostly include images showing the friend.

Example 6

Figure 30:
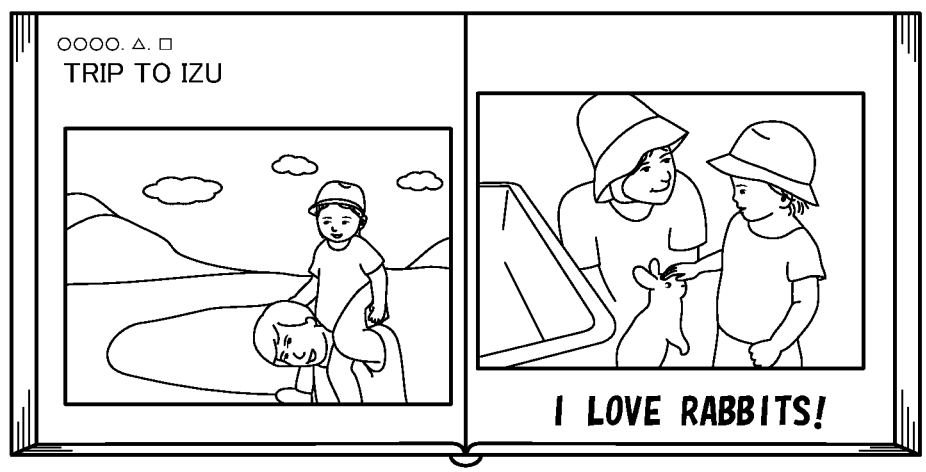
FIG. 30 is a view for explaining an example where characters are added in marginal areas of a photograph album.
Figure 31:
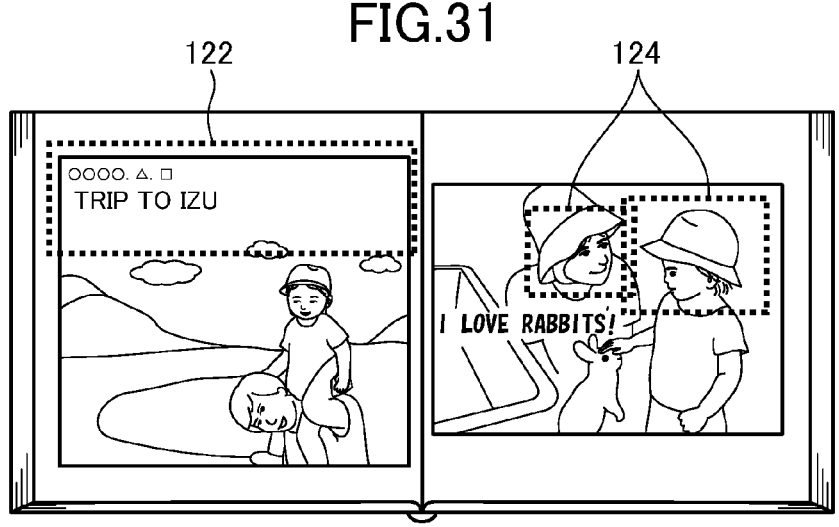
FIG. 31 is a view for explaining an example where characters are added in a vacant region and a region other than a face region of a photograph album.

FIGS. 30 and 31 illustrate examples where character synthesis areas are determined using area extraction of a major subject, a sky, and the ground. Image extraction is performed in such a manner that similarly to the above example, most desirable images are extracted from frame images extracted from a moving image and still images.

FIG. 30 shows a case where characters are superposed on a marginal area of a photograph album, i.e., an area containing no image therein. On the other hand, FIG. 31 shows a case where, in the left page of a photograph album, a vacant region 122 is selected in the layout, and characters are superposed on the vacant region 122. On the right page, face regions 124 are selected in the layout, and characters are superposed on an area clear of the face regions 124.

Thus, characters are positioned in such regions as those representing the skies and the ground or those clear of persons' faces to produce an attractive photograph album.

Example 7

Figure 32:
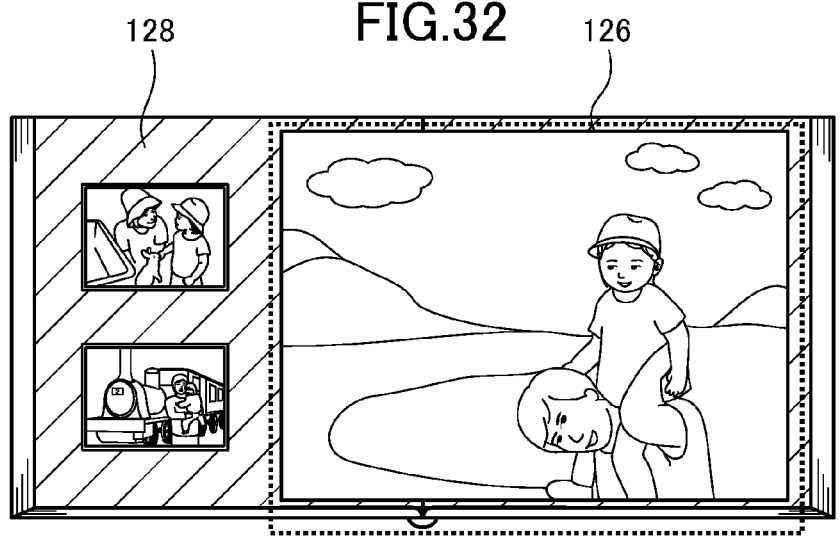
FIG. 32 is a view for explaining an example where a background template is selected according to color information of selected images.

FIG. 32 illustrates an example where a background template is selected according to color information of selected images (major image). Image extraction is effected in such a manner that, for example, similarly to the above example 3, most desirable images are extracted from frame images extracted from a moving image and still images.

FIG. 32 illustrates a case where colors (background color, background template) are designated for marginal portions of a photograph album. When colors are designated for marginal portions of a photograph album, a major image 126 is first extracted from the page. The major image herein designates an image placed at the center and has a large display size.

Next, the major image 126 is analyzed to determine the most used colors. In the example illustrated in FIG. 32, the blue sky in the background represents a large area in the major image 126, so that "blue," for example, is extracted. The background color (background image) is determined according to the extracted color ("blue"). When "blue," for example, is extracted, watery blue, which is lighter than "blue" in the major image is set as the background color so that the border between the marginal area 128 and the blue sky in the major image is clear. Thus, a watery-blue background color is set as background template.

In the above example, a single color background is used but the invention is not limited this way; a previously provided background image or an image obtained by processing an image to be placed in the layout may be used as background image.

Thus, setting background colors (background images) specific to the respective pages produces an impression of unity in image among the pages, enabling production of a more attractive photograph album.

As described above, the image processing device and the image processing method of the invention enable production of arrangement data where a still image and optimal frame images are arranged according to the analysis information and the relationship with a still image without requiring much effort for selecting frame images the user desires to use from an image even when the material data (files) contain moving image data and still image data mixed therein. Further, the image processing device and the image processing method of the invention enable production of a print, a photograph album, or an electronic album according to the arrangement data.

The type of the output for producing the print is not limited in any manner, provided that a print is produced using the present invention, and includes, for example, silver halide photography and ink jet printing. The print may be produced not only as a sheet of photograph but on such goods as various cards, calendars, mugs, T-shirts, and the like.

Although the frame images extracted from a moving image have the same resolution and aspect ratio as the moving image as precondition, a layout may be made by synthesizing a plurality of frame images from a moving image to produce and arrange a panoramic image and produce corresponding arrangement data.

The steps taken in the above image processing method may be configured into an image processing program for causing a computer to execute the steps of the image display method described above, or may be configured into an image processing program enabling a computer to function as means for executing the respective steps of the image processing method or to function as means for forming components of the image processing device described above.

Further, the above image processing program may be configured in the form of a computer readable medium or a computer readable memory.

While the image processing device, image processing method and program according to the invention have been described in detail above, the present invention is not limited to the above embodiments, and various modifications may be made without departing from the spirit and scope of the invention.

I claim:

1. An image processing device for making a layout of images, comprising:
    an image data input unit that receives data of moving images and still images,
    an image grouping unit that classifies the moving images and the still images into groups under a given condition,
    an image analyzer that analyzes the moving images and the still images as classified by the group, and that obtains analysis information obtained by analyzing the moving images and the still images and relationship information indicating relationship between the moving images and the still images,
    a frame image extractor that determines a number of frame images to be extracted from each of the moving images of the group according to a number of still images contained in the group and at least one of the analysis information and the relationship information, and extracts a determined number of frame images, said still images contained in the group not including the frame images that make up the moving images,
    a layout determining unit that determines a layout of the still images and the frame images by the group according to at least one of the analysis information and the relationship information, and
    an image arranging unit that arranges the still images and the frame images by the group according to the layout.

2. The image processing device according to claim 1, wherein the given condition is at least one of a shooting time, a shooting location, and a subject.

3. The image processing device according to claim 1, wherein the relationship information is information comparing the analysis information on the moving images and the analysis information on the still images.

4. The image processing device according to claim 3, wherein the relationship information further comprises representative values calculated by weighting the respective analysis information on the moving images and the still image, and wherein the representative values are compared to judge whether there is a relationship between the frame images and the still image.

5. The image processing device according to claim 1, wherein the relationship information is the analysis information.

6. The image processing device according to claim 1, wherein the analysis information uses at least one of items including face recognition of a subject's face, a number of subjects, a size of a subject, a position of a subject, a direction in which a subject faces, a direction of a subject's face, recognition of subject's facial expression, a detection of movement, a shooting time, a shooting location, a composition, a vanishing point, colors, brightness of a whole image, vividness of a whole image, identification of a person, a camera movement amount, a shooting condition, a resolution of an image, an aspect ratio of an image, and a shooting mode.

7. The image processing device according to claim 6, wherein the layout determining unit determines a layout of the still images and the frame images according to at least two items of the analysis information.

8. The image processing device according to claim 6, wherein the frame image extractor extracts the frame images showing how a face direction changes according to the direction of a subject's face in the analysis information and the relationship information, and
    wherein the layout determining unit decides on a layout in which the extracted frame images showing how a face direction changes are arranged in a given direction.

9. The image processing device according to claim 6, wherein the layout determining unit decides on a layout in which other still images and frame images are so superposed on the still images or the frame images containing a major subject as not to hide the major subject contained in the still images or the frame images according to a position of a subject in the analysis information and the relationship information.

10. The image processing device according to claim 9, wherein the layout determining unit decides on a layout in which the other still images and frame images are not arranged in a given space located in a direction of a face of the major subject.

11. The image processing device according to claim 6, wherein the image analyzer compares a face of a person contained in the still images and a face of a person whose images each representative of growth periods are registered to identify the person contained in the still images as the person in the analysis information.

12. The image processing device according to claim 1, wherein the image analyzer determines a number obtained by subtracting a number of still images in a same group from a reference number of images, which is a maximum number of images that may be arranged by the group, as a maximum number of the frame images that may be extracted.

13. The image processing device according to claim 12, wherein the frame image extractor determines the number of frame images to be extracted from each of the moving images that does not exceed the maximum number of the frame images that may be extracted, and extracts the determined number of frame images.

14. The image processing device according to claim 1, wherein the layout determining unit decides on a layout in which the frame images are chronologically arranged around the still images.

15. The image processing device according to claim 1, wherein layout determining unit decides on a layout in which other still images or the frame images are arranged around the still images or the frame images having a depth according to a vanishing point or an image directionality.

16. The image processing device according to claim 1, wherein the frame image extractor extracts the frame images for expressing a movement according to the analysis information and the relationship information, and
wherein the layout determining unit decides on a layout in which the extracted frame images are chronologically arranged to express a movement.

17. The image processing device according to claim 1, wherein the frame image extractor extracts the frame images and produces a frame image by combining a reference frame image from among the extracted frame images and a frame image similar to the reference frame image.

18. The image processing device according to claim 1, wherein the layout comprises a background template, and
wherein the layout determining unit determines the background template according to color information of the still image or the frame image being a major image.

19. The image processing device according to claim 1, wherein when a recomposition instruction for a given page is entered by a user, the layout determining unit recomposes a layout in the given page according to the recomposition instruction.

20. The image processing device according to claim 1, further comprising a recorder for recording data of the moving images and the still images, data of the frame images, data of the layout, and data of an arrangement by the image arranging unit, and a display for displaying a result of the arrangement.

21. The image processing device according to claim 20, wherein the groups are a plurality of groups, and extraction results of the plurality of groups are simultaneously displayed on the display when the frame images are extracted.

22. The image processing device according to claim 1, wherein when the moving images have a resolution lower than a given resolution and a total number of the still images and the frame images in each of the groups is smaller than a given number, the frame image extractor makes an adjustment by increasing the number of the frame images to be extracted from the moving images so that a display size of one image is smaller than a given size.

23. The image processing device according to claim 1, wherein when a size of a person contained in the moving images is smaller than a given size, adjustment is made by reducing the number of the frame images extracted from the moving images so that the person is displayed in a size not smaller than a given size.

24. The image processing device according to claim 1, wherein the frame image extractor increases the number of the frame images to be extracted from the moving image having an aspect ratio required for the layout and reduces the number of the frame images to be extracted from other moving images.

25. The image processing device according to claim 1, wherein the frame image extractor determines a region corresponding to a part of a display screen of the moving images and extracts the frame images with a determined region.

26. The image processing device according to claim 1, wherein the frame image extractor determines the number of the frame images to be extracted from the moving images according to at least one of reproduction time of the moving images, an imaged content of the moving images, and relationship information.

27. The image processing device according to claim 26, wherein when a total number of the still images and the frame images in each of the groups exceeds a reference number of images, which is a maximum number of images that may be arranged in each of the groups, the frame image extractor extracts recommended frame images from the extracted frame images within a range that does not exceed the reference number of images according to the analysis information.

28. The image processing device according to claim 26, wherein when a total number of the still images and the frame images in each of the groups exceeds a reference number of images, which is a maximum number of images that may be arranged in each of the groups, the frame image extractor divides a group where the total number exceeds the reference number into two or more groups.

29. The image processing device according to claim 1, wherein the frame image extractor extracts a number of the frame images selected by a user according to a reference number of images, which is a maximum number of images that may be arranged in each of the groups, from the moving images.

30. The image processing device according to claim 1, wherein the frame image extractor extracts a number of the frame images selected by a user from the moving images and, when a total number of the still images and the frame images in each of the groups exceeds a reference number of images, which is a maximum number of images that may be arranged in each of the groups, divides a group where the total number exceeds the reference number into two or more groups.

31. The image processing device according to claim 1, wherein the frame image extractor determines a number of the frame images to be extracted according to a number of pages set by a user.

32. A print production system comprising:
the image processing device described in claim 1, and
a printing device for printing data of an arrangement by the image arranging unit.

33. A photograph album production system comprising:
an image processing device described in claim 1,
a printing device for printing data of an arrangement by the image arranging unit, and
and a book binding device for binding sheets of printed paper.

34. An image processing method of producing a layout of images, comprising:
- an image data entering step of receiving data of moving image and still image,
- an image grouping step of classifying the moving images and the still image into groups under a given condition,
- an image analyzing step of analyzing the moving images and the still images as classified by the group, and obtaining analysis information obtained by analyzing the moving images and the still images and relationship information indicating relationship between the moving images and the still images,
- a frame image extracting step of determining a number of frame images to be extracted from each of the moving images of the group according to a number of still images contained in the group and at least one of the analysis information and the relationship information, said still images contained in the group not including the frame images that make up the moving images, and extracting a determined number of frame images,
- a layout determining step of determining a layout of the still images and the frame images by the group according to at least one of the analysis information and the relationship information, and
- an image arranging step of arranging the still images and the frame images by the group according to the layout.

35. A non-transitory computer readable medium storing a computer program for causing a computer to perform an image processing method of making a layout of images described in claim 34.

\* \* \* \* \*